US010635372B2

(12) United States Patent
Min et al.

(10) Patent No.: US 10,635,372 B2
(45) Date of Patent: Apr. 28, 2020

(54) DISPLAY DEVICE HAVING A TRANSPARENT DISPLAY AND A METHOD FOR CONTROLLING THE DISPLAY DEVICE TO RENDER CONTENT ON A SURFACE OF THE TRANSPARENT DISPLAY THAT A USER FACES

(71) Applicant: SAMSUNG ELECTRONICS CO., LTD., Suwon-si (KR)

(72) Inventors: Chan-hong Min, Yongin-si (KR); Sun-hwa Kim, Seoul (KR); Jin La, Suwon-si (KR); Jong-hyun Ryu, Suwon-si (KR); Kyung-ho Jeong, Seoul (KR); Yong-gook Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/542,527

(22) PCT Filed: Jan. 11, 2016

(86) PCT No.: PCT/KR2016/000222
§ 371 (c)(1),
(2) Date: Jul. 10, 2017

(87) PCT Pub. No.: WO2016/111598
PCT Pub. Date: Jul. 14, 2016

(65) Prior Publication Data
US 2018/0267766 A1 Sep. 20, 2018

(30) Foreign Application Priority Data

Jan. 9, 2015 (KR) .......................... 10-2015-0003463

(51) Int. Cl.
*G06F 3/14* (2006.01)
*G06F 3/0487* (2013.01)
(Continued)

(52) U.S. Cl.
CPC .......... *G06F 3/1446* (2013.01); *G06F 1/1637* (2013.01); *G06F 3/012* (2013.01);
(Continued)

(58) Field of Classification Search
CPC ...... G06F 1/1637; G06F 1/1652; G06F 3/041; G06F 3/0416; G06F 3/04845;
(Continued)

(56) References Cited

U.S. PATENT DOCUMENTS 9,052,769 B2 6/2015 Choi et al.
9,865,224 B2 1/2018 Yun et al.
(Continued)

FOREIGN PATENT DOCUMENTS

CN 101674361 A 3/2010
CN 102696004 A 9/2012
(Continued)

OTHER PUBLICATIONS

Communication dated May 26, 2016 issued by the International Searching Authority in counterpart International Application PCT/KR2016/000222 (PCT/ISA/220/210/237).
(Continued)

*Primary Examiner* — Keith L Crawley
(74) *Attorney, Agent, or Firm* — Sughrue Mion, PLLC

(57) ABSTRACT

Provided is a display device for efficiently providing content to a user using a transparent display. The display device includes: a transparent display; a direction determiner configured to determine a user-facing surface among a first surface and a second surface of the transparent display, the user-facing surface referring to a surface which faces a user;
(Continued)

and a controller configured to render first content on the transparent display in a direction corresponding to the first surface if the first surface faces the user, and configured to render second content on the transparent display in a direction corresponding to the second surface if the second surface faces the user.

19 Claims, 22 Drawing Sheets

(51) Int. Cl.
| | |
|---|---|
| G06F 3/0483 | (2013.01) |
| G06F 3/0488 | (2013.01) |
| G06F 3/01 | (2006.01) |
| G09G 3/20 | (2006.01) |
| G09G 5/14 | (2006.01) |
| G06F 1/16 | (2006.01) |
| G06F 3/041 | (2006.01) |
| G06F 3/0484 | (2013.01) |
| G06F 9/30 | (2018.01) |

(52) U.S. Cl.
CPC ............ *G06F 3/041* (2013.01); *G06F 3/0483* (2013.01); *G06F 3/0487* (2013.01); *G06F 3/0488* (2013.01); *G06F 3/04845* (2013.01); *G06F 3/04883* (2013.01); *G06F 9/30* (2013.01); *G09G 3/20* (2013.01); *G09G 5/14* (2013.01); *G06F 2203/04808* (2013.01); *G09G 2340/04* (2013.01); *G09G 2340/0492* (2013.01); *G09G 2354/00* (2013.01)

(58) Field of Classification Search
CPC .. G06F 3/0487; G06F 3/0488; G06F 3/04886; G06F 3/1446; G06F 9/30; G06F 2200/1637; G06F 2203/04102; G09G 2300/023; G09G 2340/0492; G09G 2380/02
See application file for complete search history.

(56) References Cited

U.S. PATENT DOCUMENTS

| | | | |
|---|---|---|---|
| 2008/0303783 A1 | 12/2008 | Weibezahn | |
| 2009/0231244 A1* | 9/2009 | Lee | G06F 1/1624 345/76 |
| 2010/0060548 A1* | 3/2010 | Choi | G06F 3/0414 345/1.3 |
| 2011/0163986 A1* | 7/2011 | Lee | G06F 1/1692 345/173 |
| 2012/0019434 A1 | 1/2012 | Kuhlman et al. | |
| 2012/0105306 A1 | 5/2012 | Fleck | |
| 2013/0065614 A1 | 3/2013 | Jung | |
| 2013/0169545 A1* | 7/2013 | Eaton | H04M 1/0241 345/173 |
| 2013/0249873 A1* | 9/2013 | Zhang | G09G 3/22 345/204 |
| 2014/0035794 A1* | 2/2014 | Chen | G06F 3/1431 345/1.3 |
| 2014/0118258 A1* | 5/2014 | Park | G06F 1/1694 345/158 |
| 2014/0168070 A1 | 6/2014 | Jeong et al. | |
| 2014/0201653 A1* | 7/2014 | Han | G06F 3/0482 715/761 |
| 2014/0347264 A1* | 11/2014 | Lee | G06F 15/0291 345/156 |
| 2015/0024728 A1* | 1/2015 | Jang | H04M 1/72519 455/418 |
| 2015/0235346 A1* | 8/2015 | Kim | G06T 3/60 345/649 |

FOREIGN PATENT DOCUMENTS

| | | |
|---|---|---|
| EP | 2 187 256 A2 | 5/2010 |
| JP | 2009-48072 A | 3/2009 |
| KR | 10-2014-0017420 A | 2/2014 |
| WO | 2013/048868 A2 | 4/2013 |

OTHER PUBLICATIONS

Communication dated Jul. 15, 2019, issued by the Korean Intellectual Property Office in corresponding Korean Application No. 10-2015-0003463.

Communication dated Oct. 22, 2019 by the State Intellectual Property Office of P.R. China in counterpart Chinese Patent Application No. 201680005342.X.

* cited by examiner

DISPLAY DEVICE HAVING A TRANSPARENT DISPLAY AND A METHOD FOR CONTROLLING THE DISPLAY DEVICE TO RENDER CONTENT ON A SURFACE OF THE TRANSPARENT DISPLAY THAT A USER FACES

TECHNICAL FIELD

The present invention relates to a display device having a transparent display and a method of controlling the display device, and more particularly, to a method of rendering content using a transparent display and a display device therefor.

BACKGROUND ART

Research into transparent displays has been actively conducted, and the transparent displays have been applied to various electronic devices. A transparent display refers to a display configured to display an image using a transparent electronic device and, in some cases, to see behind the display using for example, glass. For example, the transparent display may be formed using a transparent oxide semiconductor and a transparent electrode instead of conventional non-transparent silicon and metal based on Active Matrix Organic Light-Emitting Diode (AMOLED) technology.

On the other hand, the transparent display has an advantage of providing a user with both sides of a display, as well as allowing the user to see a background opposite the display.

Therefore, there is a need for a method and device that can utilize both sides of the transparent display to provide content to a user more effectively.

In addition, the transparent display may be implemented on a flexible support so that the physical shape thereof may be deformed. For example, an Organic Light-Emitting Diode (OLED) display may include stacks of organic layers with a thickness of tens of nanometers. The OLED display may be placed on a thin and flexible support to support deformation thereof by which the support can be bent without damage.

DETAILED DESCRIPTION OF THE INVENTION

Technical Problem

An example embodiment of the present invention provides a display device for efficiently providing content to a user by using a transparent display, and the display device.

Technical Solution

Provided is a display device for efficiently providing content to a user by using a transparent display, and the display device. The display device includes a transparent display, a direction determiner configured to determine a user-facing surface among a first surface and a second surface of the transparent display, and a controller configured to render first content on the transparent display in a direction corresponding to the first surface if the first surface faces the user, and configured to render second content on the transparent display in a direction corresponding to the second surface if the second surface faces the user.

Advantageous Effects of the Invention

An example embodiment of the present invention may efficiently provide content to a user using a transparent display.

BEST MODE

Figure 1:
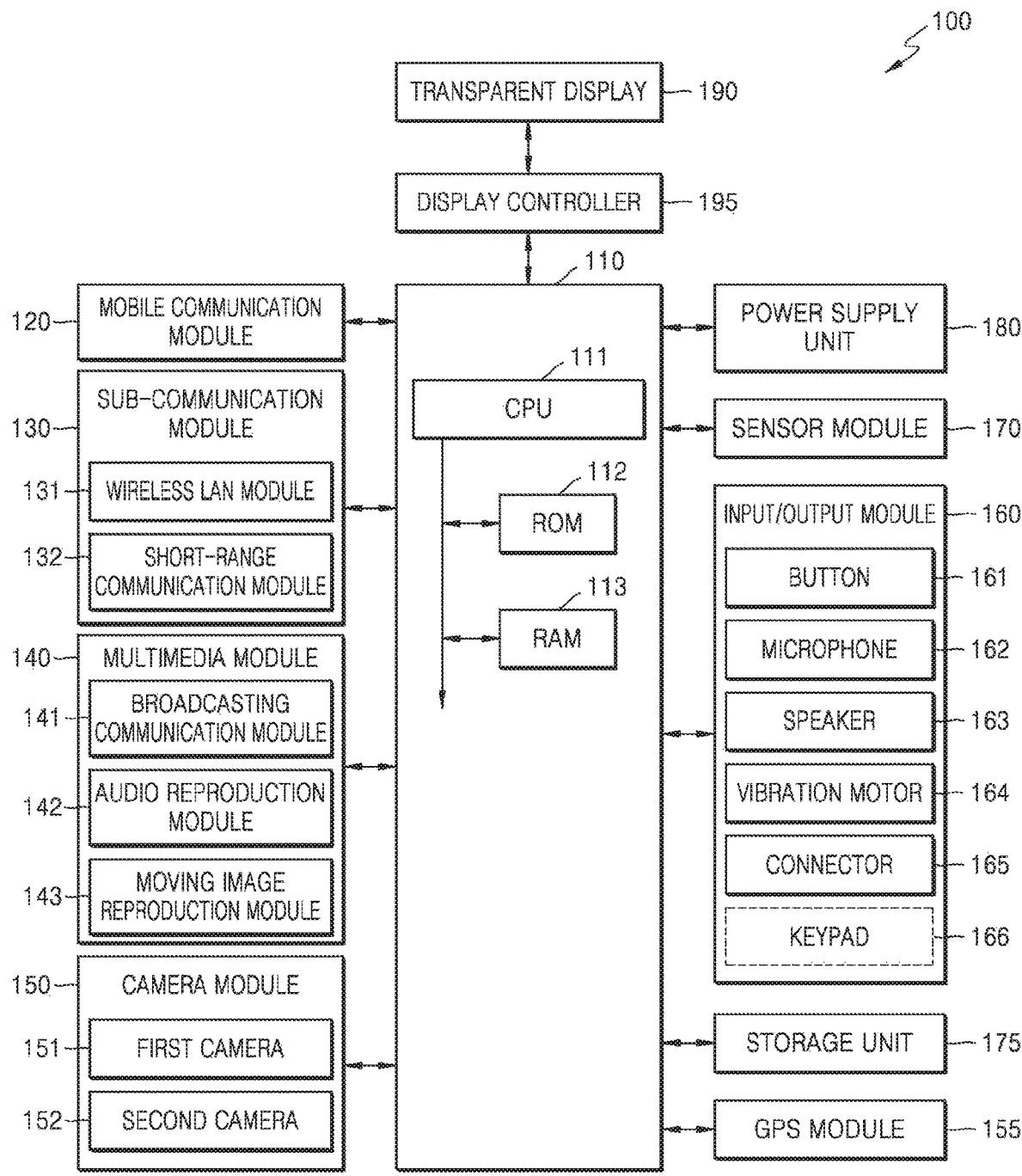
FIG. 1 is a block diagram of a display device according to some example embodiments.

As technical means for solving the above-mentioned technical problem, a display device according to some example embodiments of the present invention may include a transparent display, a direction determiner configured to determine a user-facing surface among a first surface and a second surface of the transparent display, the user-facing surface referring to a surface which faces a user; and a controller configured to render first content on the transparent display in a direction corresponding to the first surface if the first surface faces the user, and configured to render second content on the transparent display in a direction corresponding to the second surface if the second surface faces the user.

A display device according to some example embodiments further includes a storage unit configured to store a first state related to the first content and a second state related to the second content, and the controller is configured to render first content on a transparent display based on the stored first state when the user-facing surface has been changed from the second surface to the first surface, and is configured to render the second content on the transparent display based on the stored second state when the user-facing surface has been changed from the first surface to the second surface.

According to some example embodiments, the direction determiner includes a sensor unit capable of sensing rotation of the display device, and is configured to determine that the user-facing surface has been changed when the sensor unit senses rotation of the display device.

According to some example embodiments, the controller is configured to determine a direction in which to render the first content or the second content based on a rotation direction of the display device and to render the first content or the second content based on the determined direction.

According to some example embodiments, the sensor unit includes a gyro sensor and is configured to detect the rotation of the display device using the gyro sensor.

According to some example embodiments, the transparent display includes a flexible display that is physically deformable, and the controller may be configured to render the first content and the second content on the transparent display based on a type of the transparent display.

According to some example embodiments, the direction determiner includes a first camera arranged to face the first surface and a second camera arranged to face the second surface, and may determine that a user-facing direction corresponds to the first surface when a first image captured using the first camera is recognized to include the face of a user, and determine that the user-facing direction corresponds to the second surface when a second image captured using the second camera is recognized to include the face of a user.

As technical means for solving the above-mentioned technical problem, a display device according to some example embodiments may include a transparent display for receiving at least one touch input for at least one of first and second surfaces, and a direction determiner for determining a user-facing surface referring to a surface which faces a user among the first and second surfaces; and a controller configured to determine a content to be rendered and a direction to render the determined content based on a position of the at least one touch input and the user-facing surface, and to render the determined content on the transparent display based on the determined direction.

According to some example embodiments, the direction determiner may determine the user-facing surface based on a moving direction of a position of the at least one touch input.

As technical means for solving the above-mentioned technical problem, a method of controlling a display device according to some example embodiments may include determining a user-facing surface among a first surface and a second surface of the transparent display, the user-facing surface referring to a surface which faces a user, and rendering first content on the transparent display in a direction corresponding to the first surface if the first surface faces the user, and rendering second content on the transparent display in a direction corresponding to the second surface if the second surface faces the user.

According to some example embodiments, the method of controlling the display device may include storing a first state related to the first content and a second state related to the second content, and the rendering may include rendering first content on the transparent display based on the stored first state when the user-facing surface has been changed from the second surface to the first surface, and rendering the second content on the transparent display based on the stored second state when the user-facing surface has been changed from the first surface to the second surface.

According to some example embodiments, the determining of the user-facing surface may include sensing rotation of the display device, and changing the user-facing surface when the rotation is sensed.

According to some example embodiments, the rendering may include determining a direction of rendering content corresponding to the changed user-facing surface from the first content or the second content based on a direction of the sensed rotation; and rendering the first content or the second content based on the determined direction.

According to some example embodiments, the transparent display includes a flexible display that is physically deformable, and the method of controlling the display device may further include determining a position where a shape of the transparent display is deformed, and the rendering may include rendering the first content and the second content on the transparent display based on the determined direction.

According to some example embodiments, the display device further includes a first camera arranged to face the first surface and a second camera arranged to face the second surface, and the determining of the user-facing direction may include determining that the user-facing direction corresponds to the first surface when a first image captured using the first camera is recognized to include the face of a user, and determining that the user-facing direction corresponds to the second surface when a second image captured using the second camera is recognized to include the face of a user.

As technical means for solving the above-mentioned technical problem, a method of controlling a display device having a transparent display according to some example embodiments may include receiving at least one touch input for at least one of first and second surfaces, and determining a user-facing surface referring to a surface which faces a user among the first and second surfaces; and determining a content to be rendered and a direction to render the determined content based on a position of the at least one touch input and the user-facing surface, and rendering the determined content on the transparent display based on the determined direction.

According to some example embodiments, the determining of the user-facing surface may include determining the user-facing surface based on a moving direction of a position of the at least one touch input.

Furthermore, a non-transitory computer-readable recording medium according to some example embodiments may be a non-transitory computer-readable recording medium having recorded thereon a program for executing the above-described method.

Mode of the Invention

The terminology used herein is for the purpose of describing particular embodiments only and is not intended to be limiting of the present invention. As used herein, the singular forms 'a', 'an' and 'the' are intended to include the plural forms as well, unless the context clearly indicates otherwise. It will be further understood that the terms 'comprises' and/or 'comprising,' when used in this specification, specify the presence of stated elements, operations, etc., but do not preclude the presence or addition of one or more other elements, operations, etc.

Reference will now be made in detail to example embodiments, examples of which are illustrated in the accompanying drawings, wherein like reference numerals refer to like elements throughout. In this regard, the present disclosure may have different forms and should not be construed as being limited to the descriptions set forth herein. In addition, descriptions of well-known functions and constructions will be omitted for clarity and conciseness, and similar reference numerals are assigned to similar elements throughout the specification.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicated.

Throughout the specification, a content (including first and second contents) may be referred to as an output that is output through a display device. For example, the content may include at least one of a text, a moving image, a still image, an application execution screen, a menu screen, and a web page. The first and second contents may be identical types of contents or may be different types of contents.

Hereinafter, one or more example embodiments will be described more fully with reference to the accompanying drawings.

FIG. 1 is a block diagram of a display device 100 according to some example embodiments. FIG. 1 shows only the display device 100 according to some example embodiments, and the display device 100 may include fewer or more components than components shown in FIG. 1, according to the example embodiments.

The display device 100 may be connected to an external device (not shown) using a mobile communication module 120, a sub-communication module 130, and a connector 165. The external device may include at least one of other devices (not shown), a cell phone (not shown), a smart phone (not shown), a tablet PC (not shown), and a server (not shown). However, the external device is not limited thereto.

Referring to FIG. 1, the display device 100 may include a transparent display 190 and a display controller 195. Furthermore, the display device 100 may include a controller 110, the mobile communication module 120, the sub-communication module 130, a multimedia module 140, a camera module 150, a Global Positioning System (GPS) module 155, an input/output module 160, a sensor module 170, a storage unit 175, and a power supply unit 180. The sub-communication module 130 may include at least one of a wireless local area network (LAN) module 131 and a short-range communication module 132. The multimedia module 140 may include at least one of a broadcasting communication module 141, an audio reproduction module 142, and a moving image reproduction module 143. The camera module 150 may include at least one of a first camera 151 and a second camera 152. The input/output module 160 may include at least one of a button 161, a microphone 162, a speaker 163, a vibration motor 164, a connector 165, and a keypad 166.

The controller 110 may include a central processing unit (CPU) 111, read-only memory (ROM) 112 for storing a control program for controlling the display device 100, and random-access memory (RAM) 113 that stores a signal or data input from the outside of the display device 100 or is used as a storage area for operations performed by the display device 100. The CPU 111 may include a plurality of processors such as a single core, a dual core, a triple core, or a quad core. The CPU 111, the ROM 112, and the RAM 113 may be connected to each other via an internal bus BUS. The present invention is not limited to the configuration of the controller 110 shown in FIG. 1, and the controller 110 may be configured by at least one hardware, software, or a combination of hardware and software.

The controller 110 may process data and control each portion of the display device 100. That is, the controller 110 may control the mobile communication module 120, the sub-communication module 130, the multimedia module 140, the camera module 150, the GPS module 155, the input/output module 160, the sensor module 170, the storage unit 175, the power supply unit 180, the transparent display 190, and the display controller 195.

The mobile communication module 120 may allow the display device 100 to be connected to an external device through mobile communication using one or more antennas (not shown) under the control of the controller 110. The mobile communication module 120 may transmit and receive a wireless signal for a voice call, a video call, or a Short message Service (SMS) or a Multimedia Message Service (MMS) transmission to and from a mobile phone, a smart phone (not shown), a tablet PC (not shown), or other devices (not shown) having a telephone number input to the display device 100.

The sub-communication module 130 may include at least one of the wireless LAN module 131 and the short-range communication module 132. For example, the sub-communication module 130 may include only the wireless LAN module 131, only the short-range communication module 132, or both the wireless LAN module 131 and the short-range communication module 132.

The wireless LAN module 131 may be connected to the Internet at a location where a wireless access point (AP) (not shown) is installed under the control of the controller 110. The wireless LAN module 131 may support the IEEE 802.11x wireless LAN standard. The short-range communication module 132 may wirelessly perform short-range communication between the display device 100 and an image forming device (not shown) under the control of the controller 110. The short-range communication may include Bluetooth, infrared data association (IrDA), Zig-Bee, and the like.

The display device 100 may include at least one of the mobile communication module 120, the wireless LAN module 131, and the short-range communication module 132 according to performance.

The multimedia module 140 may include the broadcasting communication module 141, the audio reproduction module 142, or the moving image reproduction module 143. The broadcast communication module 141 may receive a broadcast signal (for example, a TV broadcast signal, a radio broadcast signal, or a data broadcast signal) transmitted from a broadcast station through a broadcast communication antenna (not shown) and broadcast additional information (for example, an Electric Program Guide (EPG) or an Electric Service Guide (ESG), under the control of the controller 110. The audio reproduction module 142 may reproduce digital audio files stored or received under the control of the controller 110. The moving image reproduction module 143 may reproduce a digital moving image file stored or received under the control of the controller 110. The moving image reproduction module 143 may reproduce a digital audio file.

The multimedia module 140 may include the audio reproduction module 142 and the moving image reproduction module 143 but not the broadcast communication module 141. Furthermore, the audio reproduction module 142 or the moving image reproduction module 143 of the multimedia module 140 may be included in the controller 100.

The camera module 150 may include at least one of the first camera 151 and the second camera 152 for capturing still images or moving images under the control of the controller 110. In addition, the first camera 151 or the second camera 152 may include an auxiliary light source (not shown) for providing light intensity required for photographing. The first camera 151 may be arranged on a first surface of the display device 100 (for example, a front side of the display device 100) and the second camera 152 may be arranged on a second surface of the display device 100 (For example, a rear surface of the display device 100). According to another example embodiment, the camera module 150 may include a greater number of cameras.

The GPS module 155 receives electric waves from a plurality of GPS satellites (not shown) in earth orbit and uses time of arrival of electric waves from the GPS satellites (not shown) to the display device 100 to calculate a position of the display device 100.

The input/output module 160 may include at least one of a plurality of buttons 161, the microphone 162, the speaker 163, the vibration motor 164, the connector 165, and the keypad 166.

The microphone 162 may receive voice or sound under the control of the controller 110 to generate an electrical signal.

The speaker 163 may output sound corresponding to various signals of the mobile communication module 120, the sub-communication module 130, the multimedia module 140, or the camera module 150 under the control of the controller 110 to the outside of the display device 100. The speaker 163 may output sound corresponding to functions performed by the display device 100. One or more speakers 163 may be at one or more appropriate positions of a housing of the display device 100.

The vibration motor 164 may convert an electrical signal into mechanical vibration under the control of the controller 110. For example, the display device 100 in a vibration mode may operate the vibration motor 164 when a voice call is received from another device (not shown). When the transparent display 190 is configured as a touch screen capable of sensing a touch input, the vibration motor 164 may operate in response to a touch operation of a user touching the transparent display 190 and continuous movement of a touch input on the transparent display 190.

The connector 165 may be used as an interface for connecting the display device 100 to an external device (not shown) or a power source (not shown). An external device (not shown) may receive data stored in the storage unit 175 of the display device 100 or may output data via a wired cable connected to the connector 165 under the control of the controller 110. A power source (not shown) may output power or charge a battery (not shown) via the wired cable connected to the connector 165.

The keypad 166 may receive a key input from a user to control the display device 100. The keypad 166 includes a physical keypad (not shown) formed in the display device 100 or a virtual keypad (not shown) displayed on the transparent display 190. The physical keypad (not shown) formed in the display device 100 may be excluded depending on the performance or structure of the display device 100.

The sensor module 170 includes at least one sensor for detecting a state of the display device 100. For example, the sensor module 170 may include a proximity sensor for detecting whether or not a user is approaching the display device 100, an illuminance sensor (not shown) for detecting the amount of light around the display device 100, or a motion sensor (e.g., a gyro sensor) (not shown) for detecting a motion of the display device 100 (e.g., rotation of the display device 100, acceleration or vibration applied to the display device 100). A sensor of the sensor module 170 may be added or omitted depending on the performance of the display device 100.

The storage unit 175 may store signals or data input/output corresponding to operations of the mobile communication module 120, the sub-communication module 130, the multimedia module 140, the camera module 150, the GPS module 155, the input/output module 160, the sensor module 170, and the transparent display 190 under the control of the controller 110. The storage unit 175 may store control programs and applications for controlling the display device 100 or the controller 110.

The term "storage unit" may include the storage unit 175, the ROM 112 in the controller 110, the RAM 113, or a memory card (not shown) installed in the display device 100. The storage unit may include a nonvolatile memory, a volatile memory, a hard disk drive (HDD), or a solid state drive (SSD).

The power supply unit 180 may supply power to at least one battery (not shown) disposed in the housing of the display device 100 under the control of the controller 110. In addition, the power supply unit 180 may supply power input from an external power source (not shown) to each portion of the display device 100 via the wired cable connected to the connector 165.

The transparent display 190 may output a user interface corresponding to various services to a user. When the transparent display 190 is configured as a touch screen capable of sensing a touch input, the transparent display 190 may transmit an analog signal corresponding to at least one touch input to the user interface to the display controller 195. The transparent display 190 may receive at least one touch input through a user's body part (e.g., a finger) or a touchable input means (e.g., a stylus pen). Furthermore, the transparent display 190 may receive continuous movement of at least one touch input. The transparent display 190 may transmit an analog signal corresponding to the continuous movement of the touch input to the display controller 195.

The term "touch input" in this specification is not limited to the input through the contact between the transparent display 190 and a user's body part or a touchable input means, but may include a non-contact input (e.g., an interval between the transparent display 190 and a user's body part is 1 mm or less). An interval that can be detected in the transparent display 190 may vary according to the performance or structure of the display device 100.

A touch screen may be implemented by, for example, a resistive method, a capacitive method, an infrared method, or an ultrasound wave method.

The display controller 195 may convert the analog signal received from the transparent display 190 into a digital signal (e.g., an X coordinate and a Y coordinate) and transmit the digital signal to the controller 110. The controller 110 may control the transparent display 190 using the digital signal received from the display controller 195. For example, the controller 110 may select an application execution icon (not shown) displayed on the transparent display 190 or execute an application in response to a touch input. The display controller 195 may be included in the transparent display 190 or the controller 110.

Figure 2:
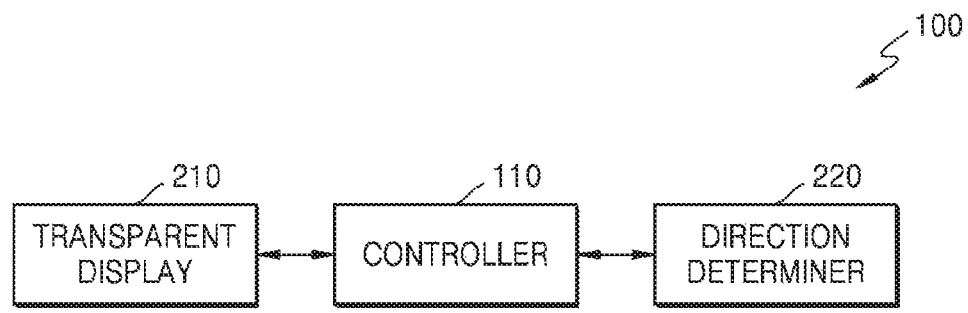
FIG. 2 is a block diagram of a display device according to some example embodiments.

FIG. 2 is a block diagram of the display device 100 according to some example embodiments. FIG. 2 shows only the display device 100 according to some example embodiments, and the display device 100 may include fewer or more components than components shown in FIG. 2, according to the example embodiments.

The display device 100 according to some example embodiments may include a transparent display 210, a direction determiner 220, and the controller 110. The transparent display 210 has a transparent property and may display an image under the control of the controller 110. The transparent display 210 is not necessarily integral with the display device 100, but may be an external device connected to the display device 100. The transparent display 210 may include only the transparent display 190 of FIG. 1, or may further include the display controller 195.

The direction determiner 220 may determine a user-facing surface related to the display device 100. The user-facing surface may indicate a surface which faces a user among a plurality of surfaces of the transparent display 210. According to some example embodiments, one of the first and second surfaces of the transparent display 210, which faces a user, may be determined to be the user-facing surface. The first and second surfaces (e.g., front and rear surfaces) may refer to opposite surfaces of the transparent display 210. Although the direction determiner 220 is shown as an independent component in FIG. 2, the direction determiner 220 may be included in the controller 110. For example, the controller 110 and the direction determiner 220 may be configured by a single processor. Alternatively, the direction determiner 220 may be configured by a combination of the controller 110 and other components. For example, the direction determiner 220 may be configured by a combination of the camera module 150 for capturing an image and a face recognition module (not shown) for recognizing a face from the captured image. For example, the direction determiner 220 may include the sensor module 170 for detecting movement (e.g., rotation or movement of the position) of the display device 100. As another example, the direction determiner 220 may include the display controller 190 and the transparent display 190 configured to receive a user's touch input.

Figure 3:
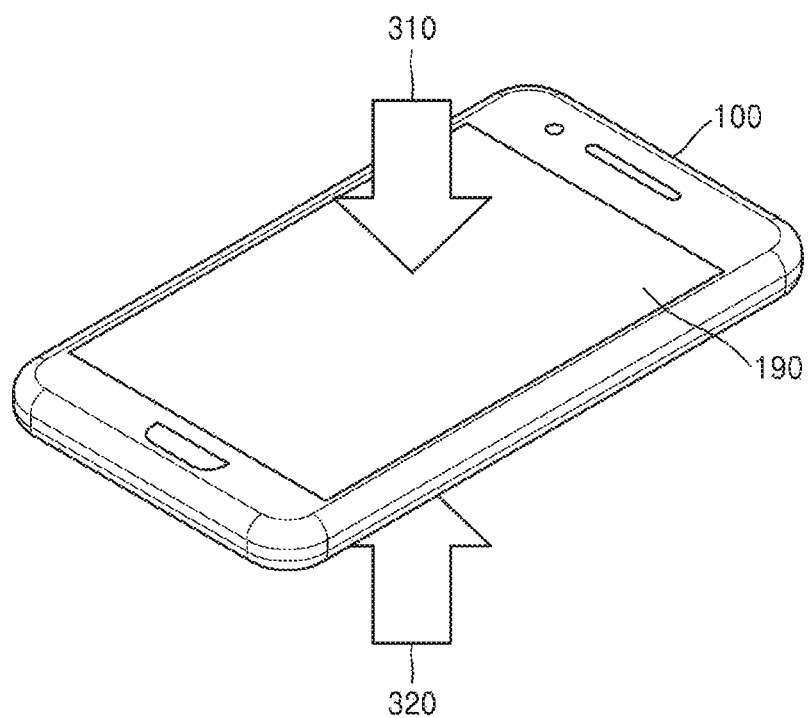
FIG. 3 is an exemplary view of an external appearance of a display device according to some example embodiments.

FIG. 3 is an exemplary view of an external appearance of the display device 100 according to some example embodiments. Referring to FIG. 3, a surface of the transparent display 190 of the display device 100 in a front surface direction 310 may be a first surface. In addition, a surface of the transparent display 190 of the display device 100 in a rear surface direction 320 may be a second surface.

Referring again to FIG. 2, the controller 110 may determine content to be rendered on the transparent display 210 according to a user-facing surface determined by the direction determiner 220. For example, if the first surface (e.g., the front surface) of the transparent display 210 is a user-facing surface, the controller 110 may render first content (e.g., a moving image reproduction screen) on the transparent display 210. Furthermore, if the second surface (e.g., the rear surface) of the transparent display 210 is a user-facing surface, the controller 110 may render second content (e.g., a text) on the transparent display 210. Here, the direction in which the second content is rendered may be opposite to the direction in which the first content is rendered, horizontally or vertically.

Furthermore, according to some example embodiments, the controller 110 may render the first content or the second content based on a first state or a second state stored in the storage unit 175. The first state may refer to information indicating a state of the first content finally provided to a user. For example, if the first content is a moving image, the first state may include at least one of identification information for identifying the moving image being played, position information indicating a position where the moving image is played, identification information for identifying a running application, and information related to an operating state of the application. Also, the second state may refer to information indicating a state of the second content finally provided to a user.

Thus, the display device 100 may provide the first content to a user when the user is looking at the first surface of the transparent display 190. Also, the display device 100 may provide the second content to a user when the user is looking at the second surface of the transparent display 190. The display device 100 may store the first state and the second state indicating the final state of the first content and the second content. By rendering the first content or the second content based on the first state or the second state, the display device 100 may provide a user experience such as a user using two devices. That is, when a user reverses the display device 100 while using the display device 100 on which the first content is rendered, the user may use a device on which the second content is rendered. If the user reverses the display device 100 again, the user may continue to use the first content.

Figure 4:
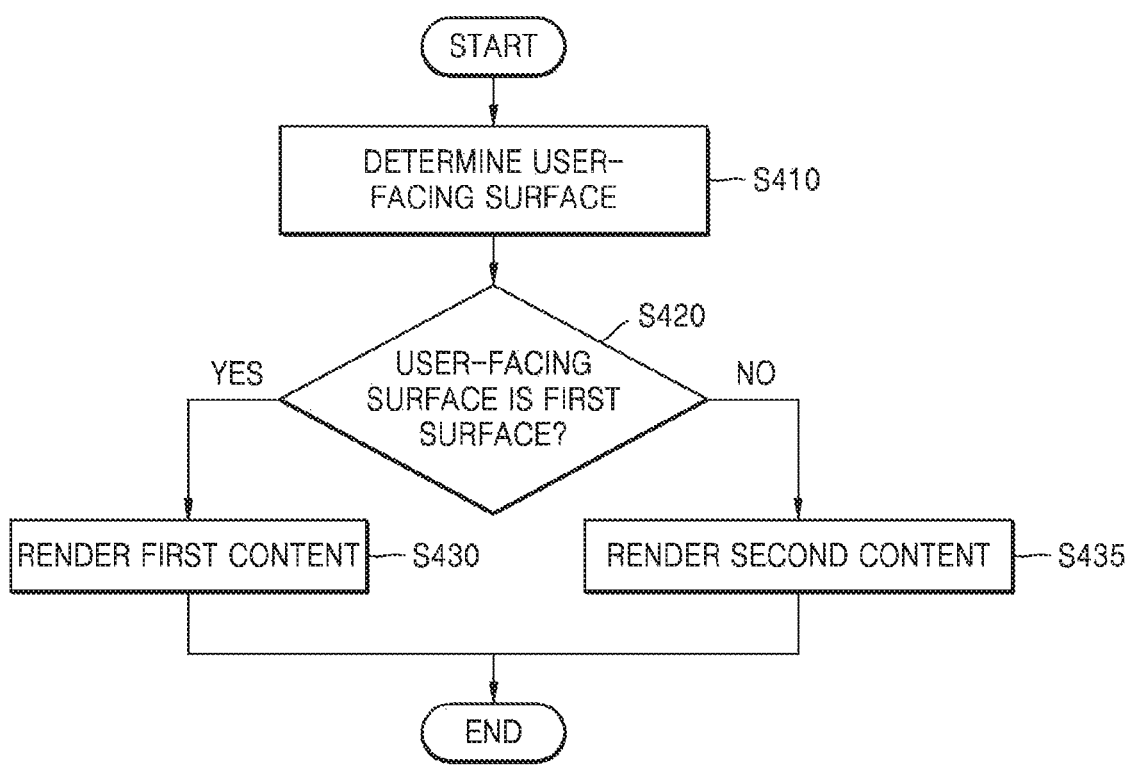
FIG. 4 is a flowchart of a process for controlling a display device according to some example embodiments.

FIG. 4 is a flowchart of a process for controlling the display device 100 according to some example embodiments.

First, in operation S410, the display device 100 may determine a user-facing surface related to the display device 100. The user-facing surface may indicate a surface which faces a user among a plurality of surfaces of the transparent display 210. According to some example embodiments, one of the first and second surfaces of the transparent display 210, which faces a user, may be determined to be the user-facing surface. The first and second surfaces (e.g., front and rear surfaces) may refer to opposite surfaces of the transparent display 210. A method of determining a user-facing surface may be variously implemented according to an example embodiment. For example, the display device 100 may capture an image using a plurality of cameras and determine a user-facing surface based on a direction in which a camera that captured an image of a user's face is located from the captured images. As another example, the display device 100 may sense movement (e.g., rotation or movement of the position) of the display device 100 and may determine that a user-facing surface has been changed as motion in which the display device 100 is determined to be reversed is detected. As another example, the display unit 100 may determine that a user-facing surface has been changed based on a touch input of a user.

Thereafter, in operation S420, if the user-facing surface is the first surface, the display device 100 may render the first content in operation S430. Also, in operation S430, if the user-facing surface is the second surface, the display device

100 may render the second content in operation S435. Although FIG. 4 shows that the transparent display 210 includes the first and second surfaces, the above operations may be similarly applied even when the transparent display 210 has three or more surfaces.

In operation S430, the display device 100 may render the first content based on the first state. Further, in operation S435, the display device 100 may render the second content based on the second state. The first state may refer to information indicating a state of the first content finally provided to a user. For example, if the first content is a moving image, the first state may include at least one of identification information for identifying the moving image being played, position information indicating a position where the moving image is played, identification information for identifying a running application, and information related to an operating state of the application. Also, the second state may refer to information indicating a state of the second content finally provided to a user.

Figure 5:
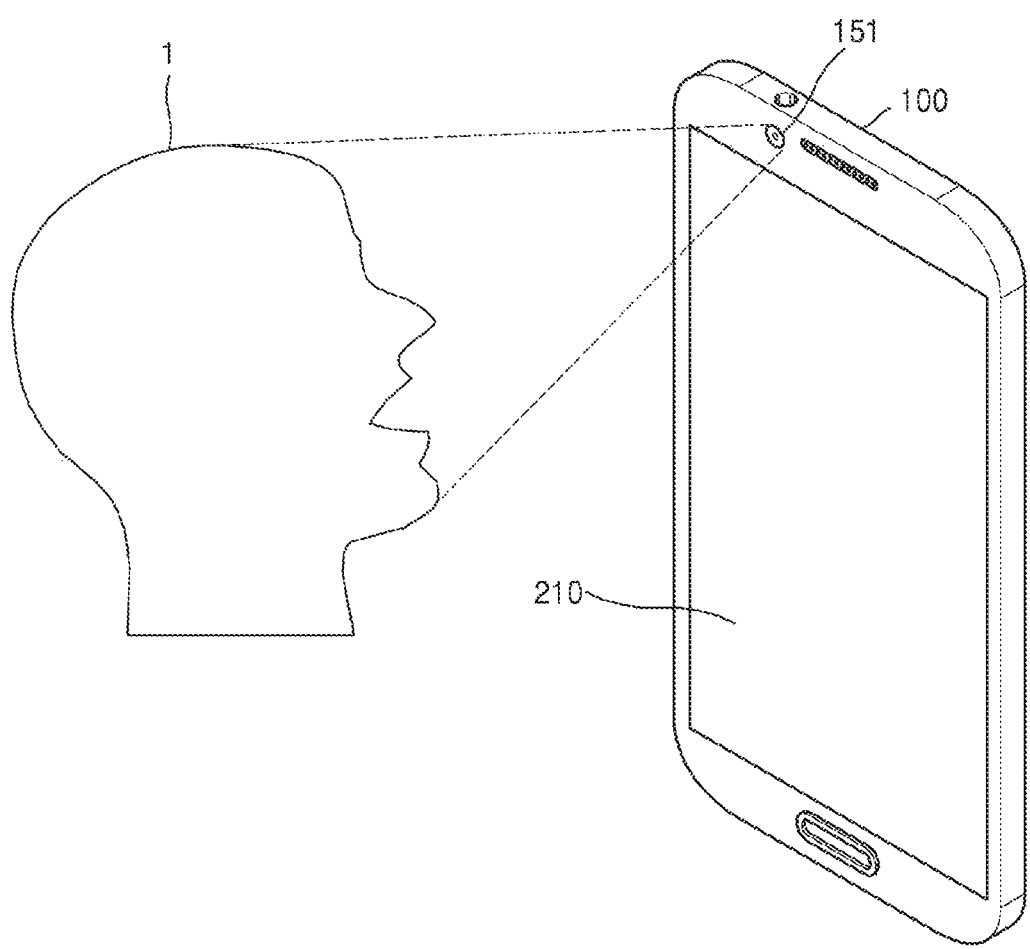
FIG. 5 is a conceptual diagram of a method for a display device to determine a user-facing surface, according to some example embodiments.

FIG. 5 is a conceptual diagram of a method for the display device 100 to determine a user-facing surface, according to some example embodiments.

According to some example embodiments, the display device 100 may include a plurality of cameras. The display device 100 may recognize whether or not the face of a user 1 is included in images captured using a plurality of cameras. When the face of the user 1 is included in an image captured by the first camera 151 from among the plurality of cameras, the display device 100 may determine a user-facing surface from among surfaces of the transparent display 210 according to a direction in which the first camera 151 is located.

Figure 6:
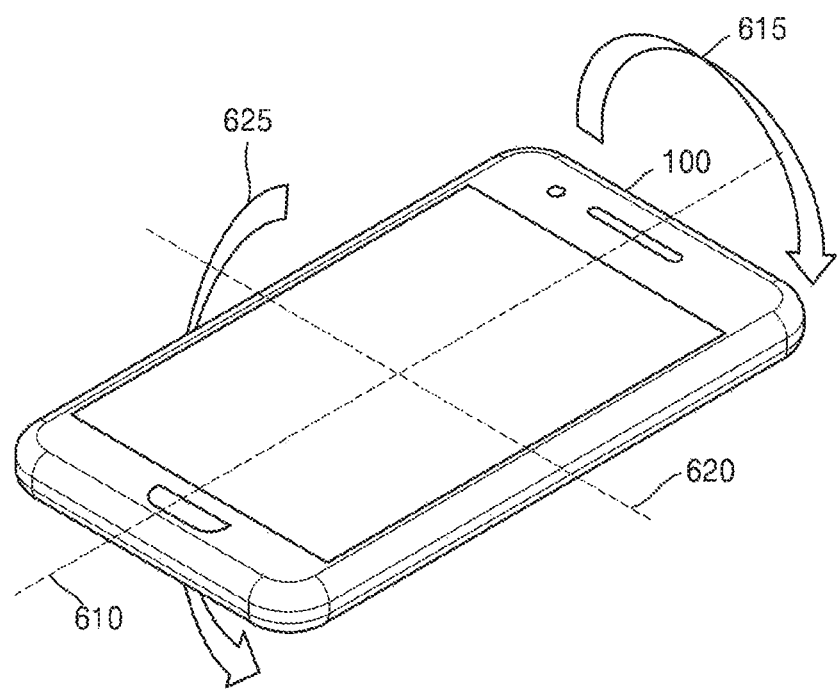
FIG. 6 is a conceptual diagram of a method for a display device to determine a user-facing surface, according to some example embodiments.

FIG. 6 is a conceptual diagram of a method for the display device 100 to determine a user-facing surface, according to some example embodiments.

The display device 100 may sense physical movement of the display device 100. For example, the display device 100 may sense rotation of the display device 100 using a gyro sensor.

Referring to FIG. 6, the display device 100 may sense physical movement of the display device 100. The display device 100 may determine whether the sensed motion is a horizontal rotation 615 based on a vertical axis 610 or a vertical rotation 625 based on a horizontal axis 620. When magnitude of the horizontal rotation 615 or magnitude of the vertical rotation 625 is equal to or greater than a threshold value (for example, rotation of 90 degrees or more), the display device 100 may determine that a user-facing surface has been changed.

Figure 7:
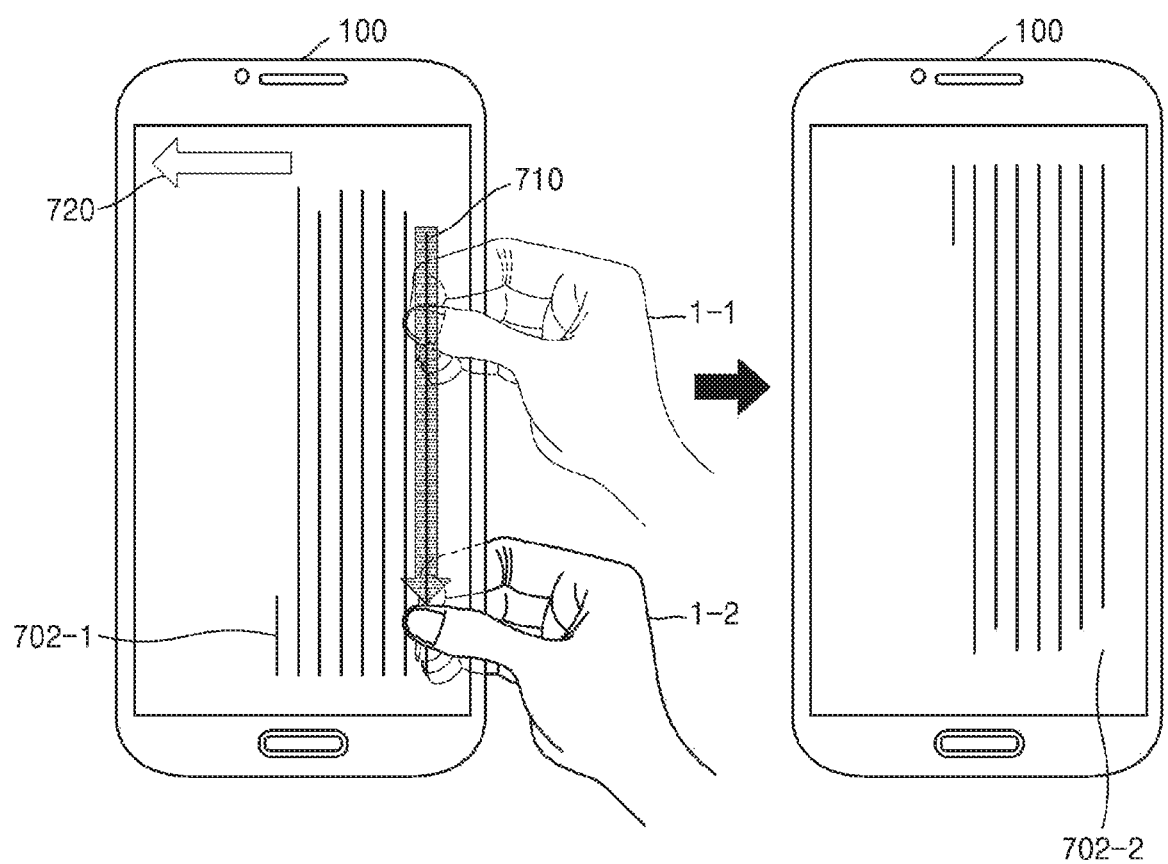
FIG. 7 is a conceptual diagram of a method for a display device to determine a user-facing surface, according to some example embodiments.

FIG. 7 is a conceptual diagram of a method for the display device 100 to determine a user-facing surface, according to some example embodiments.

According to some example embodiments, the display device 100 may receive a touch input for a transparent display. The display device 100 may determine a user-facing surface based on the touch input.

Referring to FIG. 7, first content 702-1 (e.g., a text) may be displayed in the transparent display of the display device 100. When a user 1-1 moves to a 1-2 position by dragging the user's fingers in a vertical direction 710 in a state where the user 1-1 is in contact with a corresponding point on the first and second surfaces of the transparent display, the display device 100 may determine that the user-facing surface has been changed. In this case, the display device 100 may display second content 702-2 in the transparent display. Here, the second content 702-2 may be rendered one in which an image where the first content 702-1 is reversed in a vertical direction is rendered. Also, when the touch input is dragged in a second direction 720, the second content 702-2 may be one in which an image where the first content 702-1 is reversed in a horizontal direction is rendered.

The methods shown in FIGS. 5 to 7 may be used independently according to an example embodiment, and the display device 100 may determine a user-facing surface by combining two or more of the methods. For example, the display device 100 may determine a user-facing surface using the method shown in FIG. 5, and then may change the user-facing surface depending on whether the display device 100 is rotated, based on the method shown in FIG. 6. However, FIGS. 5 to 7 show exemplary methods for determining a user-facing surface, and the display device 100 may determine a user-facing surface using methods other than those shown in FIGS. 5 to 7.

Figure 8:
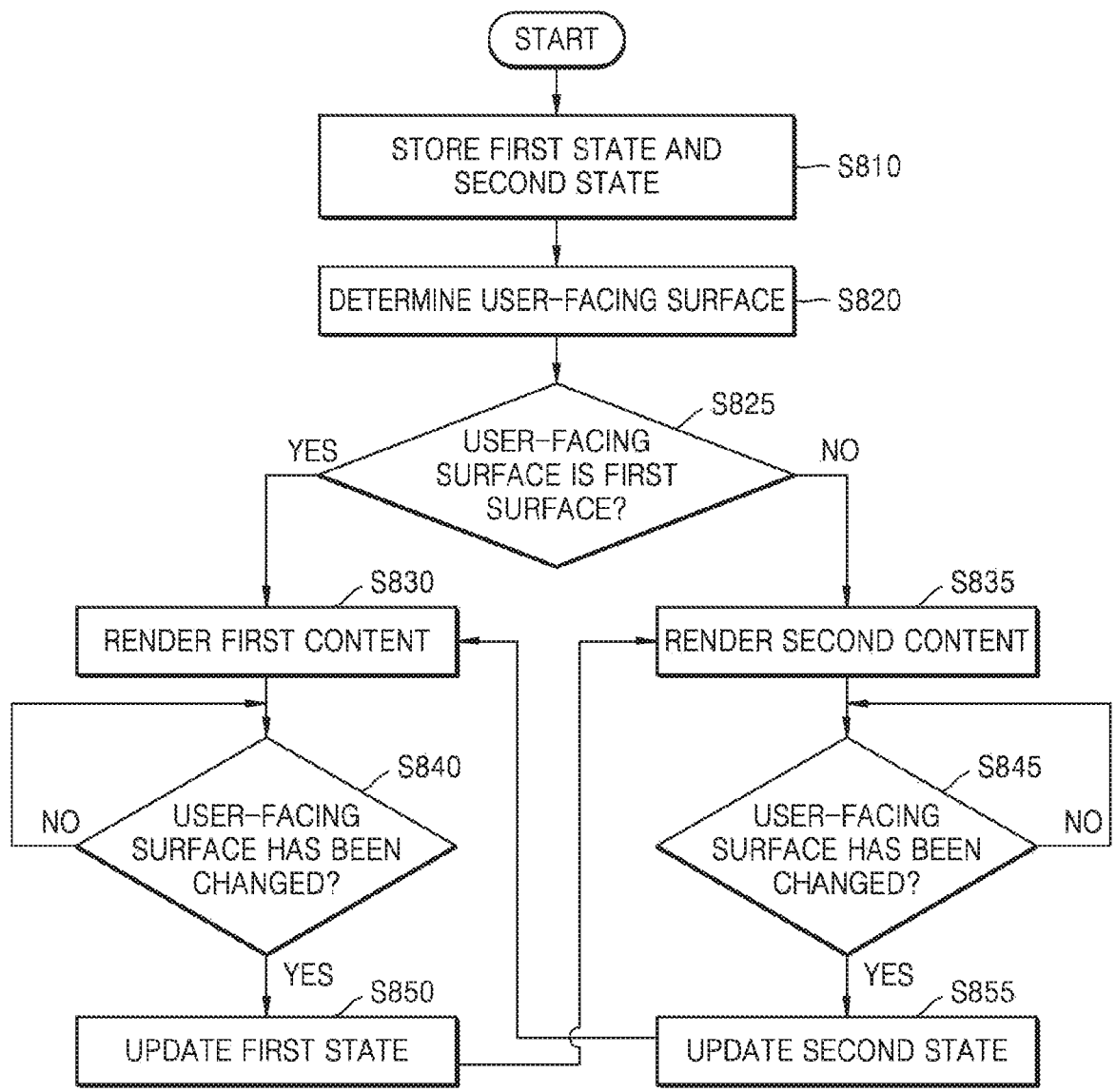
FIG. 8 is a flowchart of a process in which a display device operates in accordance with a change in a user-facing surface, according to some example embodiments.

FIG. 8 is a flowchart of a process in which the display device 100 operates in accordance with a change in a user-facing surface, according to some example embodiments.

First, in operation S810, the display device 100 may store a first state and a second state. The first state and the second state may be stored in the storage unit 175 of the display device 100. However, the present invention is not limited thereto, and the first state and the second state may be stored in an external device (for example, a server).

Next, in operation S820, the display device 100 may determine a user-facing surface. The example embodiment shown in FIG. 8 may select a user-facing surface from a first surface (a surface in a front surface direction 310) and a second surface (a surface in a front surface direction 320), or from among three or more surfaces of the transparent display 190. A method of determining a user-facing surface may be variously implemented according to an example embodiment.

Thereafter, in operation S825, if the user-facing surface determined in operation S820 is the first surface 310, in operation S830, the display device 100 may render first content based on a first state stored in operation S810. Thereafter, in operation S840, the display device 100 may determine whether the user-facing surface has been changed. For example, when rotation of the display device 100 is sensed via the gyro sensor provided in the display device 100, the display device 100 may determine that the user-facing surface has been changed. If the display device 100 determines that the user-facing surface has been changed to the second surface (a surface in a rear surface direction 320), in operation S850, the display device 100 may update the first state based on a state of the rendered first content. For example, if the first content is first page of a home screen on which icons are arranged, the display device 100 may update the stored first state with information indicating that the first page of the home screen is displayed. Thereafter, in operation S835, the display device 100 may render second content based on the stored second state. Thereafter, in operation S845, if the user-facing surface has been changed, in operation S855, the display device 100 may update the second state based on a state of the currently rendered second content. For example, if the second content is an electronic document, the display device 100 may store identification information of an application executed to render the electronic document, identification information for identifying the rendered electronic document, and information such as a position of an area rendered in the electronic document (e.g., page 2, etc.) in the second state. Thereafter, in operation S830, the display device 100 may re-render the first content that was rendered at a point in time when the user-facing surface has been changed in operation S840 based on the first state updated in operation S850.

Furthermore, if the user-facing surface determined in operation S820 is not the first surface 310 (i.e., the second surface 320), in operation S835, the display device 100 may render the second content based on information on the second state stored in operation S810. Thereafter, in operation S845, the display device 100 may determine whether the user-facing surface has been changed. If the display device 100 determines that the user-facing surface has been changed to the first surface (a surface in a front surface direction 310), in operation S855, the display device 100 may update the second state based on a state of the rendered second content. For example, if the second content rendered at a point in time when the user-facing surface has been changed is second page of the electronic document, the display device 100 may update information for rendering the second page of the electronic document to the second state. Thereafter, in operation S830, the display device 100 may render the first content based on the first state.

Figure 9:
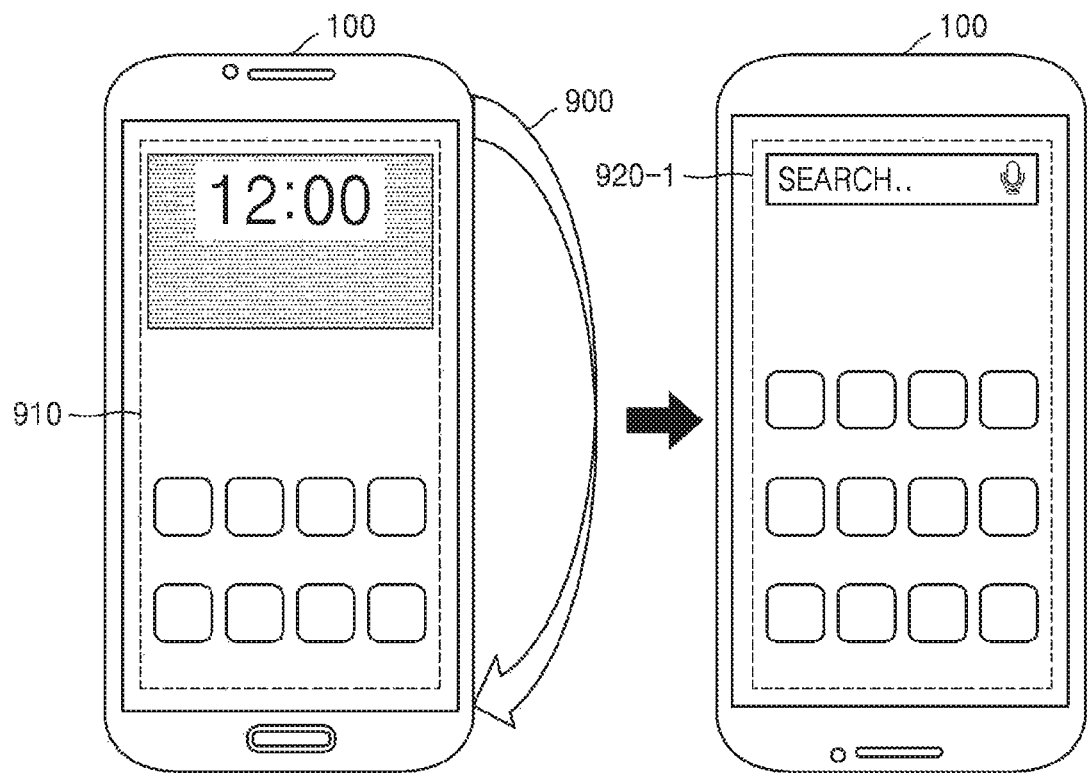
FIGS. 9 and 10 are exemplary views of operations of a display device in accordance with a change in a user-facing surface, according to some example embodiments.
Figure 10:
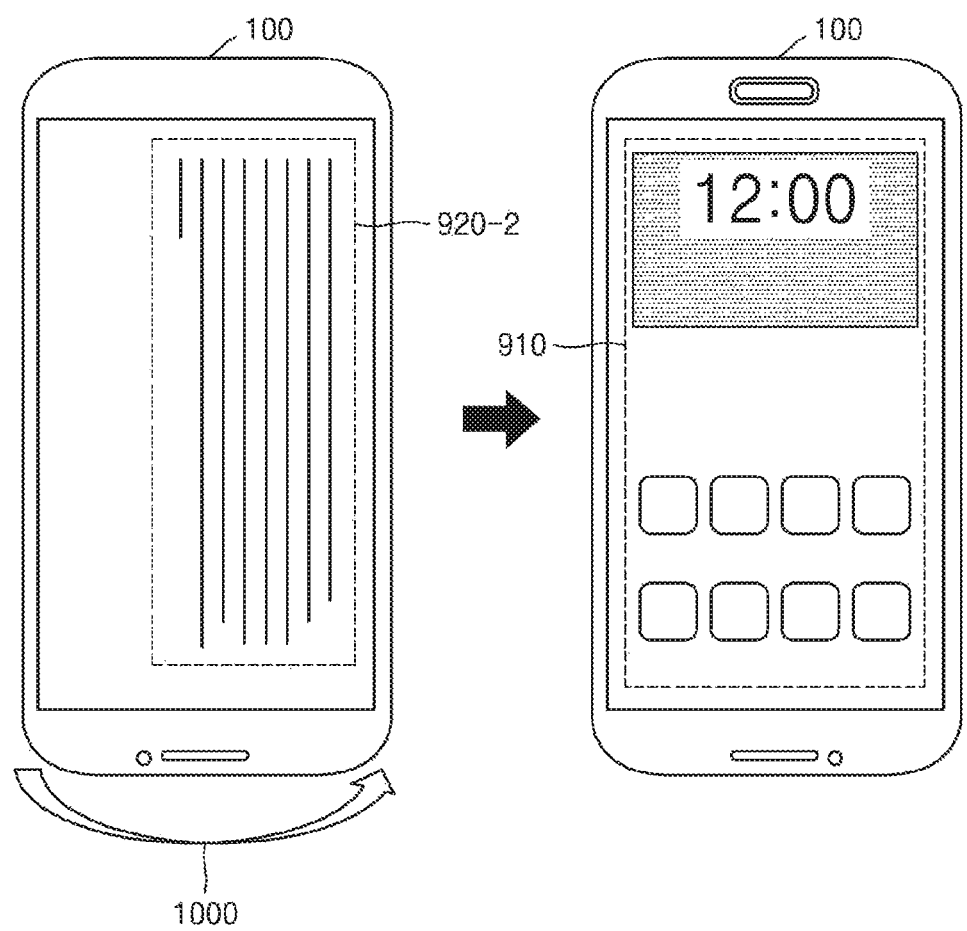

FIGS. 9 and 10 are exemplary views of operations of the display device 100 in accordance with a change in a user-facing surface, according to some example embodiments.

The display device 100 may render first content through a transparent display. Referring to FIG. 9, a home screen 910 in which icons and widgets are arranged may be rendered as the first content. In a state where the first content is rendered, the user may reverse the display device 100 in a vertical direction 900. The user-facing surface may be changed from a first surface to a second surface as the display device 100 is reversed. In this case, the display device 100 may render second content on the transparent display. As illustrated in FIG. 9, a home screen 920-1 of another page may be rendered on the transparent display. Here, the direction in which the display device 100 renders the second content may be a direction in which a direction of rendering the first content is vertically reversed. Furthermore, the display device 100 may store a first state indicating a state of the first content.

As a user operates the display device 100, content rendered in the display device 100 may be changed. Referring to FIG. 10, as a user operates the display device 100, the second content may be changed to a text 920-2. When a user reverses the display device 100 in a horizontal direction 1000, the user-facing surface may be changed from the second surface to the first surface. In this case, the display device 100 may re-render the first content based on the stored first state. Referring to FIG. 10, the home screen 910 as shown in FIG. 9 may be rendered in the transparent display. The home screen 910 of FIG. 10 may be reversed in a vertical direction from the home screen 910 of FIG. 9. By thus controlling the display device 100, the display device 100 may provide a user experience such as a user using two or more devices.

Figure 11:
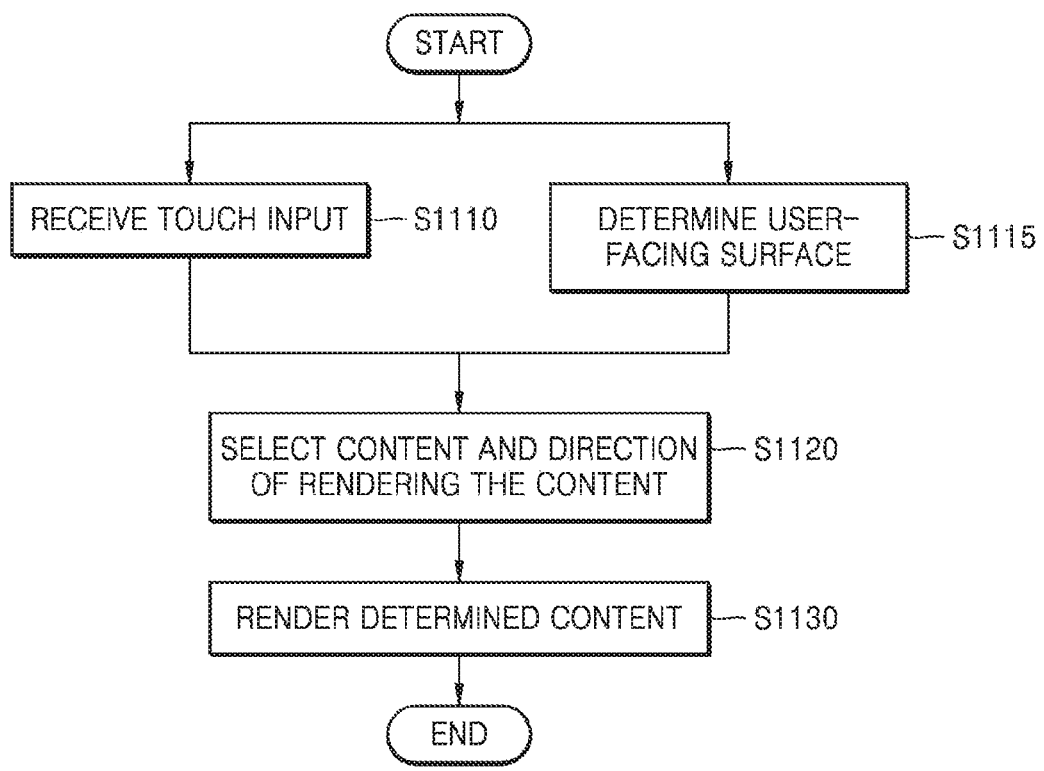
FIG. 11 is a flowchart of a process for controlling a display device according to some example embodiments.

FIG. 11 is a flowchart of a process for controlling the display device 100 according to some example embodiments.

According to some example embodiments, in operation S1110, the display device 100 may receive a touch input. Furthermore, in operation S1115, the display device 100 may determine a user-facing surface.

Thereafter, in operation S1120, the display device 100 may select content based on a position of the received touch input and the determined user-facing surface. In addition, the display device 100 may determine a direction of rendering the content based on the position of the received touch input and the determined user-facing surface. A method of determining the direction of rendering the content will be described in more detail using the examples shown in FIGS. 12 to 15. The content determined in operation S1130 may be rendered based on the determined rendering direction.

Figure 12:
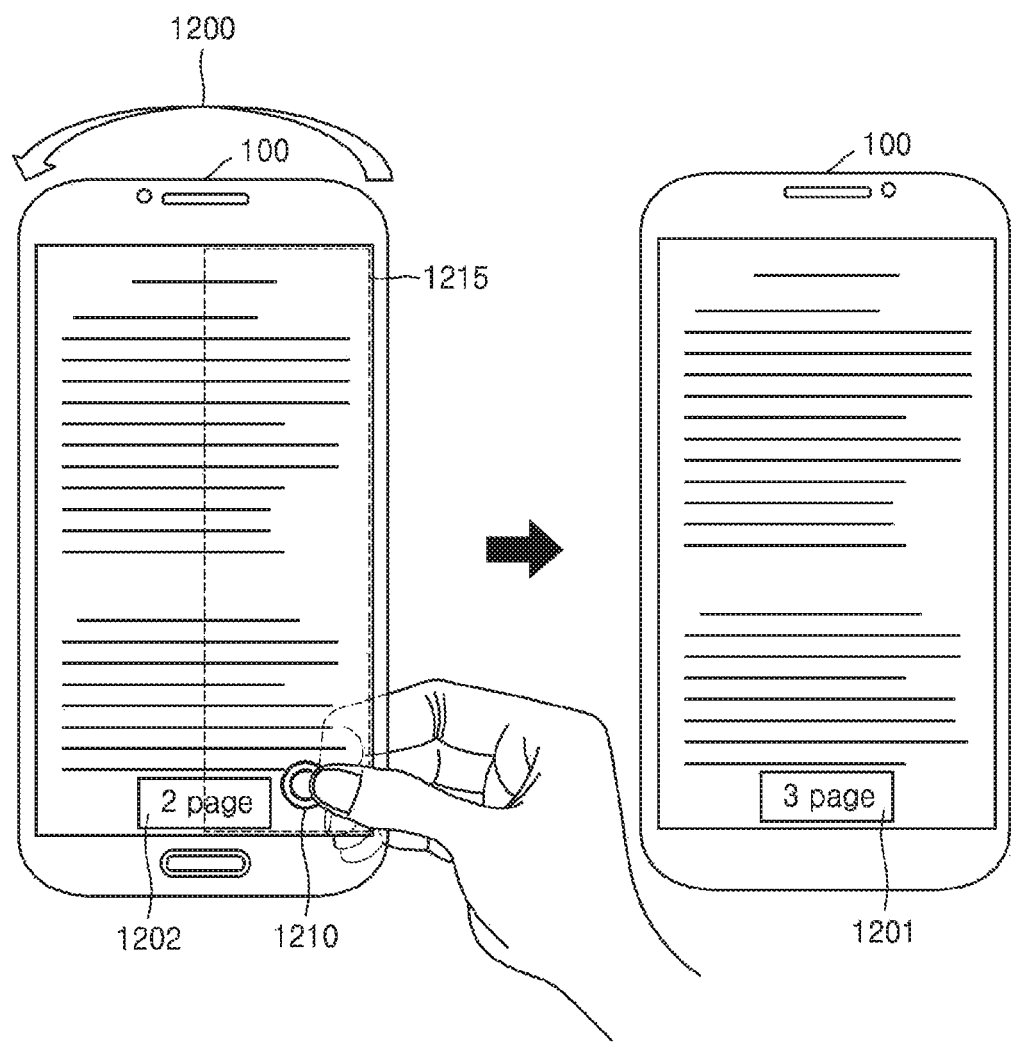
FIGS. 12 and 13 are conceptual diagrams of an example related to operations of a display device, according to some example embodiments.
Figure 13:
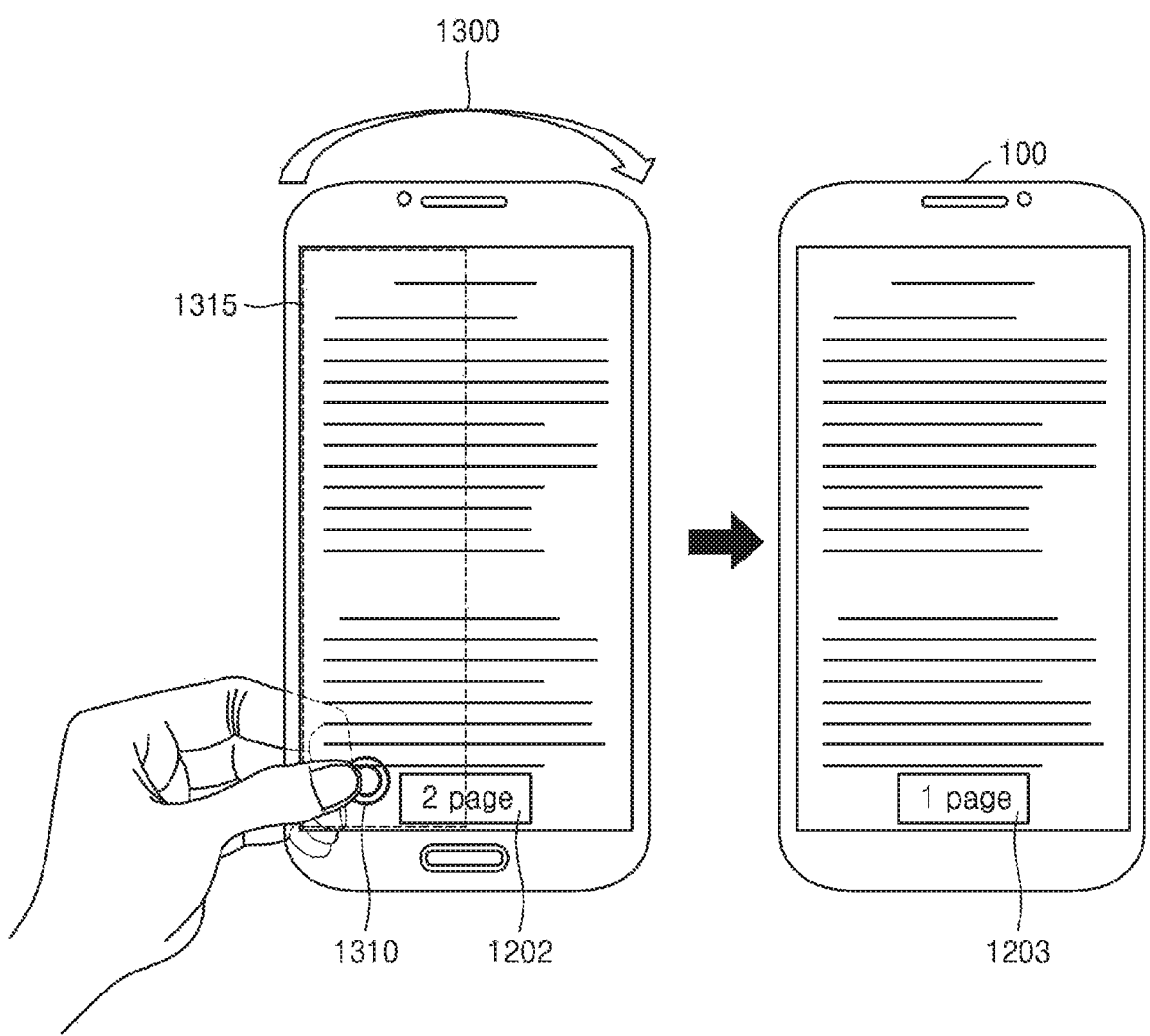

FIGS. 12 and 13 are conceptual diagrams of an example related to operations of the display device 100, according to some example embodiments. FIGS. 12 and 13 are views showing an example in which first content rendered on the display device 100 is an electronic book (hereinafter, referred to as an e-book).

Referring to FIG. 12, in a state where second page 1202 (first content) of the e-book is rendered on a transparent display of the display device 100, a user may reverse the display device 100 with two fingers holding a point 1210 in a right-half plane 1215 of the transparent display. The display device 100 may receive a touch input for a position 1210 of first surface of the transparent display and the position 1210 of second surface of the transparent display. In this case, the transparent display device 100 may be viewed as being reversed in a left direction 1200. Thereafter, the display device 100 may render third page 1201 (second content) of the e-book. By operating as shown in FIG. 12, the display device 100 may provide a user experience such as directly turning the book to the next page to the user.

Referring to FIG. 13, in a state where the second page 1202 (first content) of the e-book is rendered on the transparent display of the display device 100, a user may reverse the display device 100 with two fingers holding a point 1310 in a left-half plane 1315 of the transparent display. The display device 100 may receive a touch input for a position 1310 of the first surface of the transparent display and the position 1310 of the second surface of the transparent display. In this case, the transparent display device 100 may be viewed as being reversed in right direction 1300. Thereafter, the display device 100 may render first page 1203 (second content) of the e-book.

That is, if a user changes the user-facing surface while holding a point on the right-half plane 1215 of the transparent display, a page rendered on the transparent display may be changed to the next page. That is, if a user changes the user-facing surface while holding a point on the left-half plane 1315 of the transparent display, a page rendered on the transparent display may be changed to the previous page.

FIGS. 14, 15A, 15B, 15C and 15D are conceptual diagrams of another example related to operations of the display device 100, according to some example embodiments.

If a user-facing surface is changed while first content is rendered, the display device 100 may render second content instead of the first content.

Figure 14:
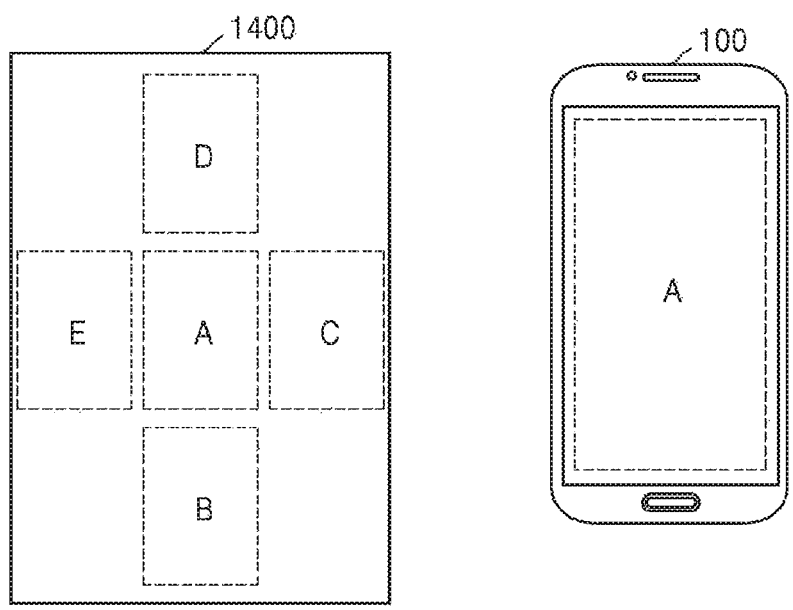
FIGS. 14, 15A, 15B, 15C and 15D are conceptual diagrams of an example related to operations of a display device, according to some example embodiments.

Referring to FIG. 14, the display device 100 may display area A, which is a partial area of the entire content (for example, the entire web page), as the first content on a transparent display. Here, if the user-facing surface of the display device 100 is changed, the display device 100 may display the second content on the transparent display. Here, the second content may vary depending on a position of a touch input received through the transparent display.

Figure 15A:
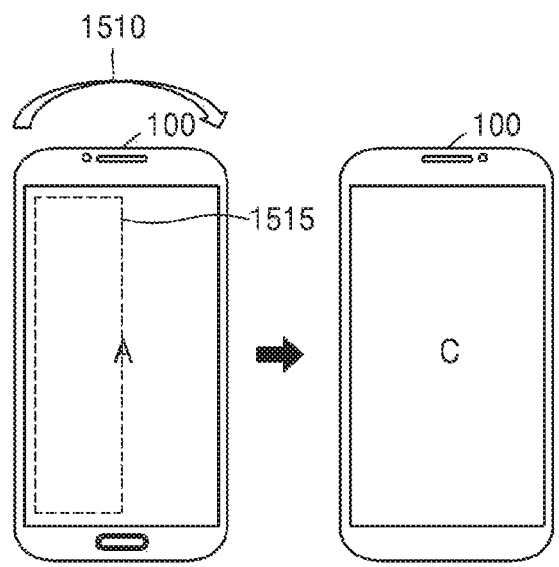
Figure 15B:
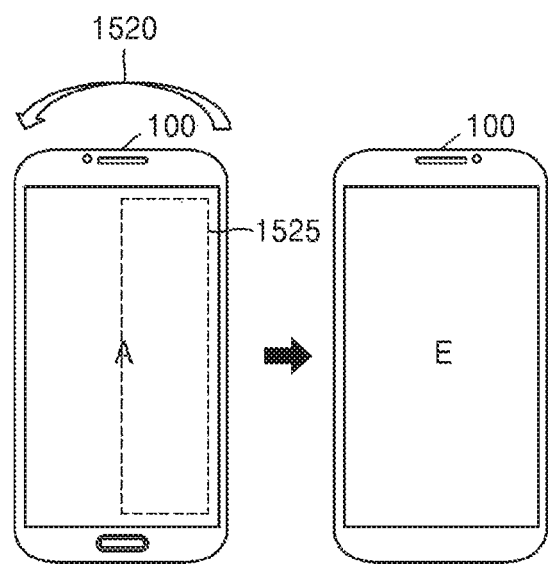
Figure 15C:
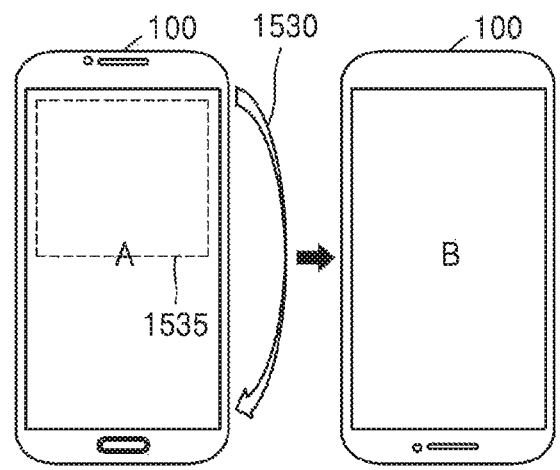
Figure 15D:
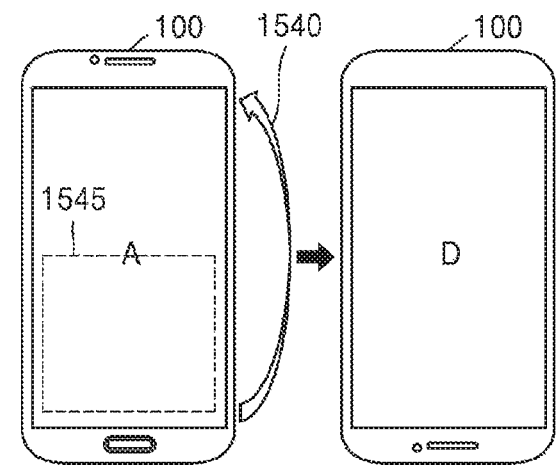

Referring to FIG. 15A, when a user reverses the display device 100 while holding a left-half plane 1515 of the transparent display, the display device 100 can be seen as being reversed in a right direction 1510. In this case, the display device 100 may display area C of content 1400 as the second content on the transparent display. Referring to FIG. 15B, when a user reverses the display device 100 while holding a right-half plane 1525 of the transparent display, the display device 100 can be seen as being reversed in a left direction 1520. In this case, the display device 100 may display area E of content 1400 as the second content on the transparent display. Furthermore, referring to FIG. 15C, when a user reverses the display device 100 while holding an upper-half plane 1535 of the transparent display, the display device 100 can be seen as being reversed in a lower direction 1530. In this case, the display device 100 may display area B of content 1400 as the second content on the transparent display. Furthermore, referring to FIG. 15D, when a user reverses the display device 100 while holding a lower-half plane 1545 of the transparent display, the display device 100 can be seen as being reversed in an upper direction 1540. In this case, the display device 100 may display area D of content 1400 as the second content on the transparent display.

However, FIGS. 12 to 15D are merely examples of some example embodiments of the present invention, and the present invention is not limited thereto.

Figure 16:
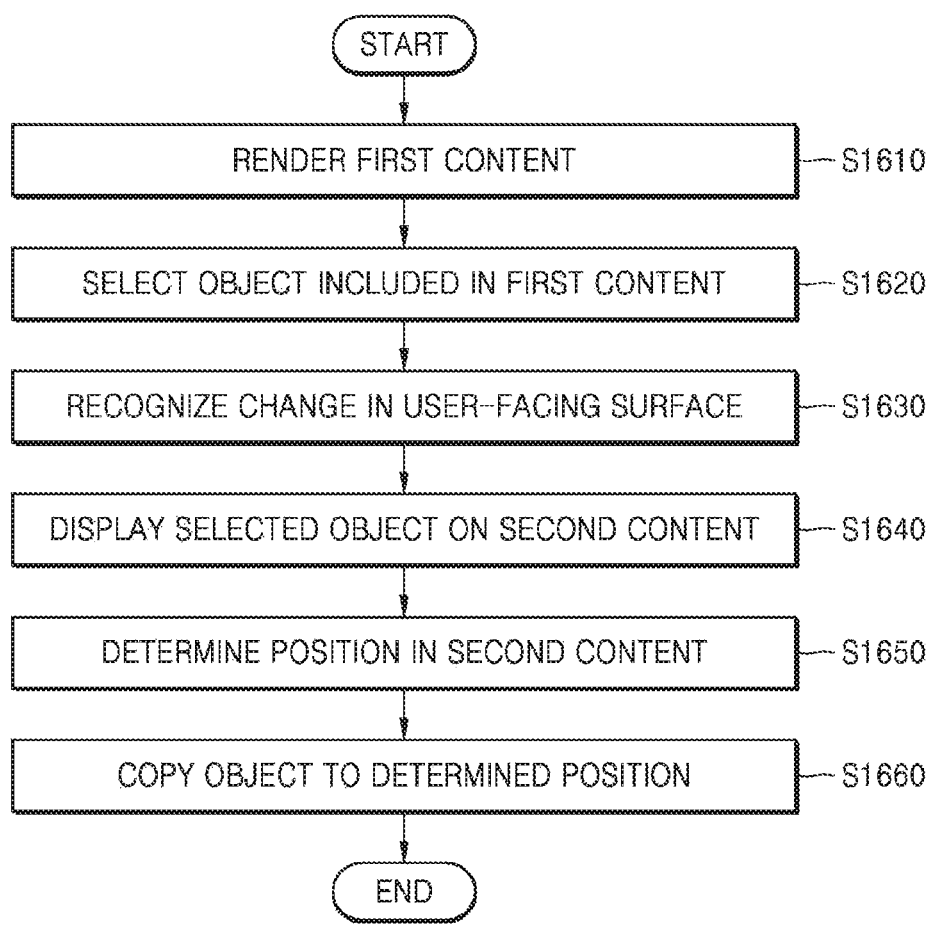
FIG. 16 is a flowchart of a process by which a display device copies an object included in content, according to some example embodiments.
Figure 17:
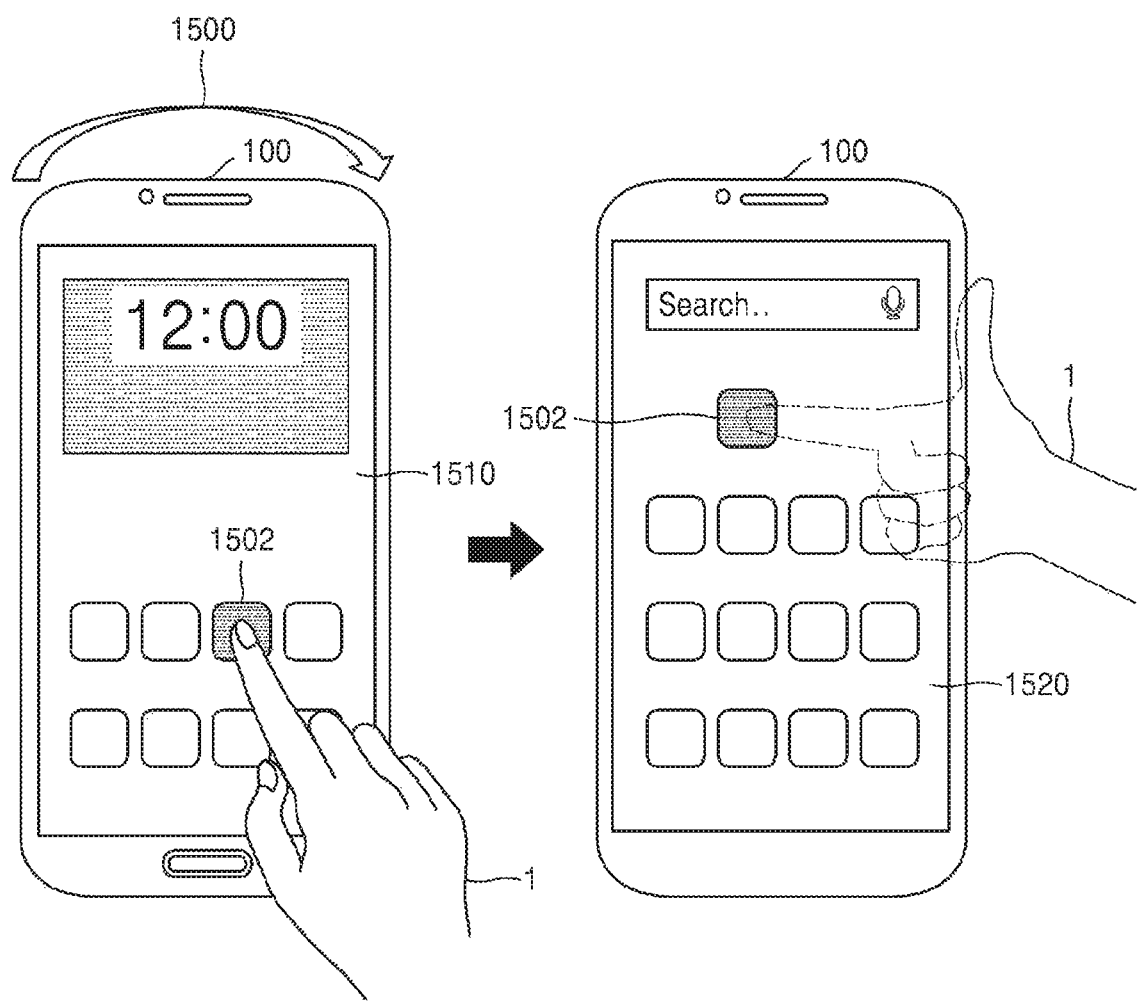
FIG. 17 is a conceptual diagram of an example related to a method by which a display device copies an object included in content, according to some example embodiments.

FIG. 16 is a flowchart of a process by which the display device 100 copies an object included in content, according to some example embodiments. FIG. 17 is a conceptual diagram of an example related to a method by which the display device 100 copies an object included in content, according to some example embodiments.

In operation S1610, the display device 100 according to some example embodiments may render first content on a transparent display. Referring to FIG. 17, the display device 100 may render one page (i.e., the first content) 1510 of a home screen including an object 1502 in the transparent display. The object 1502 is, for example, an icon or a widget which can be selected and classified in the first content by the display device 100.

Thereafter, in operation S1620, the display device 100 may select the object 1502 included in the first content 1510. Referring to FIGS. 15A to 15D, the display device 100 may select the object 1502 by the user 1 touching the object 1502 displayed on the transparent display. However, a method of selecting the object 1502 may vary according to an example embodiment.

With the object 1502 selected, in operation S1630, the display device 100 may recognize a change in a user-facing surface. That is, the user-facing surface determined by the display device 100 may be changed from a first surface to a second surface. In this case, the display device 100 may render another page (i.e., the second content) 1520 of the home screen on the transparent display. In addition, the display device 100 may display the selected object 1502 on the second content. When a touch input of the user 1 to the first surface is maintained, the display device 100 may determine a position at which the object 1502 is displayed according to a position of the touch input. Thereafter, in operation S1650, the display device 100 may determine a position to copy the object 1502 in the second content based on the touch input. For example, when the user 1 drags the position of the touch input with respect to the first surface with a fingertip and then releases the finger from the transparent display, the display device 100 may determine a position where the dragging of the touch input is completed as the position to copy the object 1502. Then, the display device 100 may copy the object 1502 on the second content so that the object 1502 is displayed at the determined position.

Figure 18:
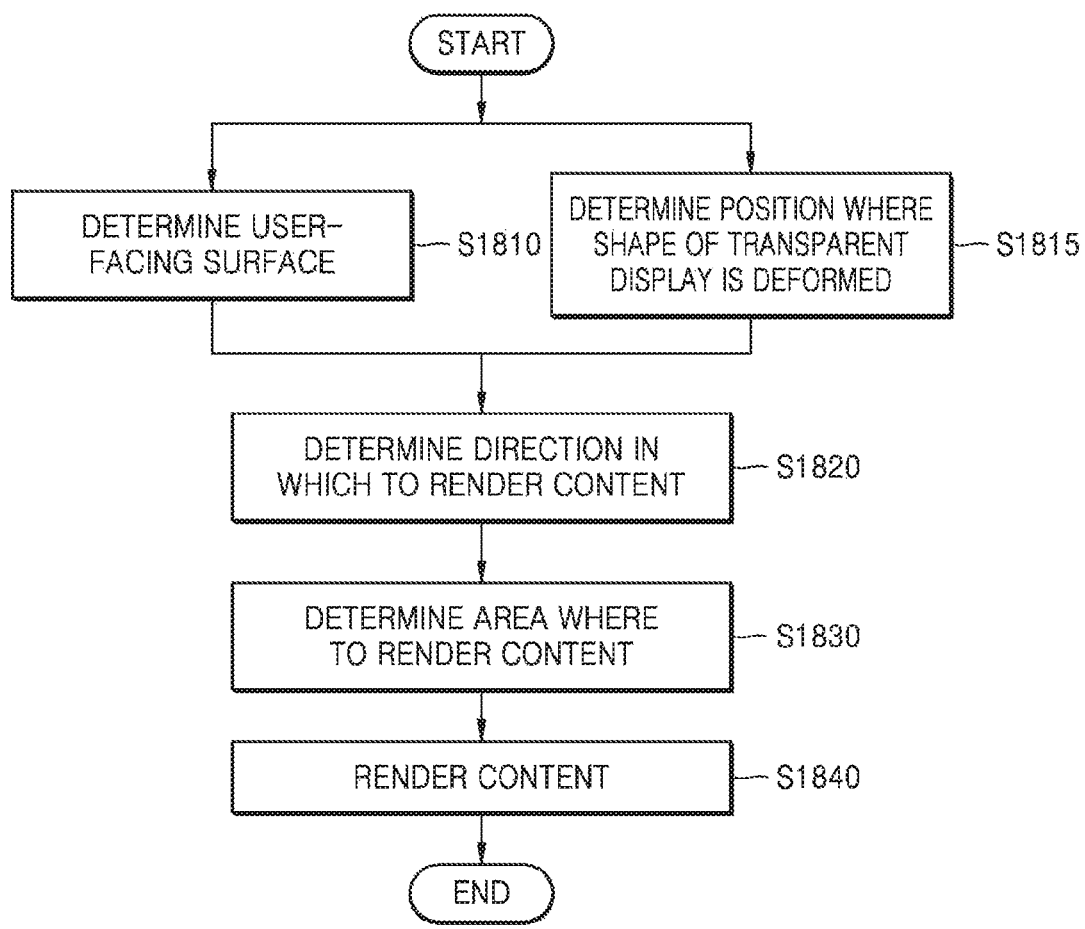
FIG. 18 is a flowchart of a process for controlling a display device according to some example embodiments in which a transparent display of the display device is flexible.

FIG. 18 is a flowchart of a process for controlling the display device 100 in accordance with some example embodiments in which the transparent display 190 of the display device 100 is flexible.

According to some example embodiments, the transparent display 190 may be a flexible display that is physically deformable. In operation S1810, the display device 100 may determine a user-facing surface. In addition, in operation S1815, if a shape of the transparent display 190 is deformed, the display device 100 may determine a position where the shape of the transparent display is deformed.

Thereafter, in operation S1820, the display device 100 may determine a direction in which to render content based on the determined user-facing surface, and in operation S1830, may determine an area where to render the content based on the position where the shape of the transparent display is deformed. Thereafter, the display device 100 may render the content in the determined direction on the determined area.

According to some example embodiments, the display device 100 may render first content and second content simultaneously. For example, if the transparent display 210 is flexible, the first content and the second content may be rendered on areas that are classified according to a type of the transparent display 210. As another example, the first content and the second content may be rendered on areas that are classified according to a touch input of a user with respect to the transparent display 210.

Figure 19:
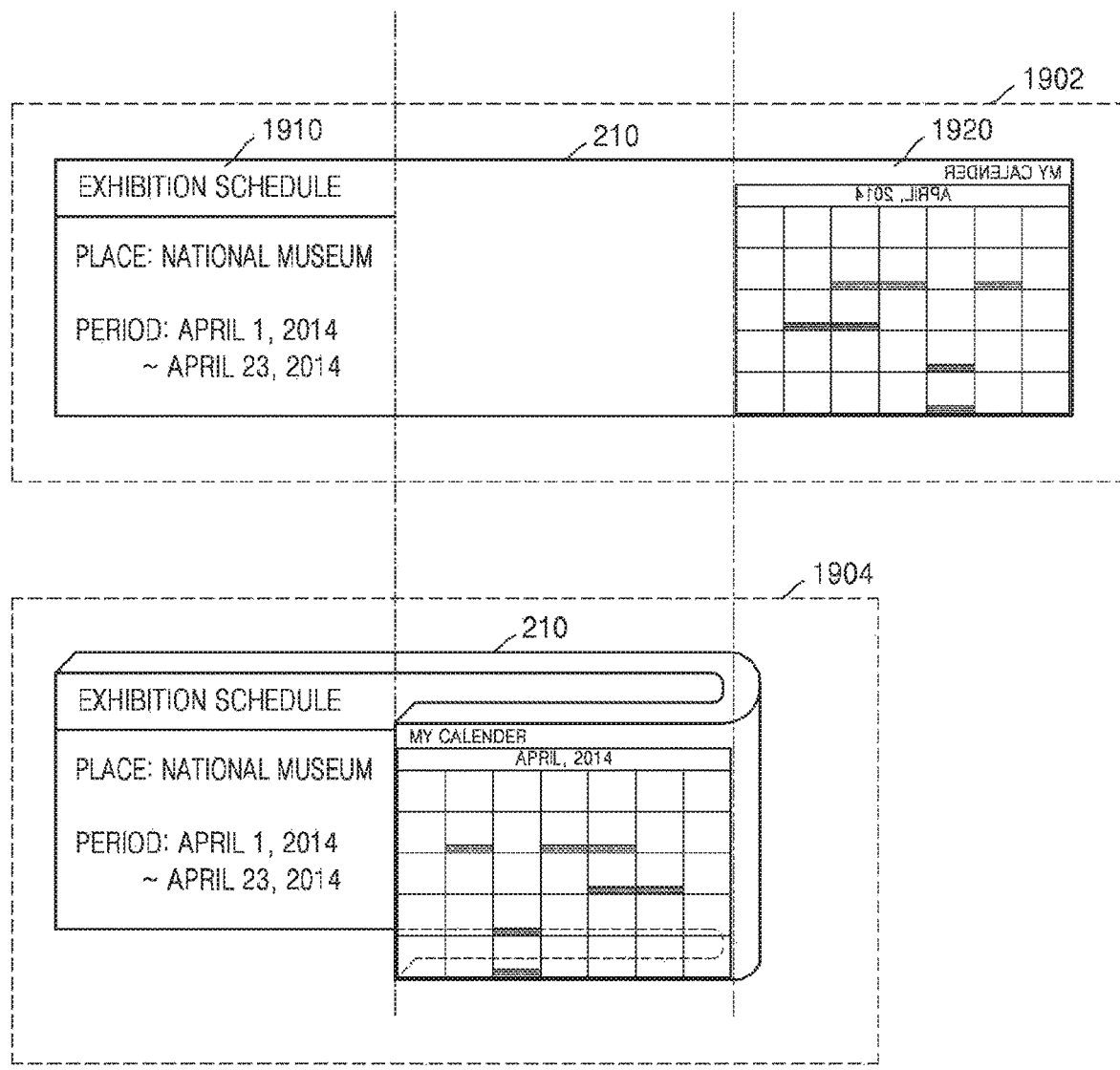
FIGS. 19 and 20 are conceptual diagrams of an example related to operations of a display device according to some example embodiments in which a transparent display of the display device is flexible.
Figure 20:
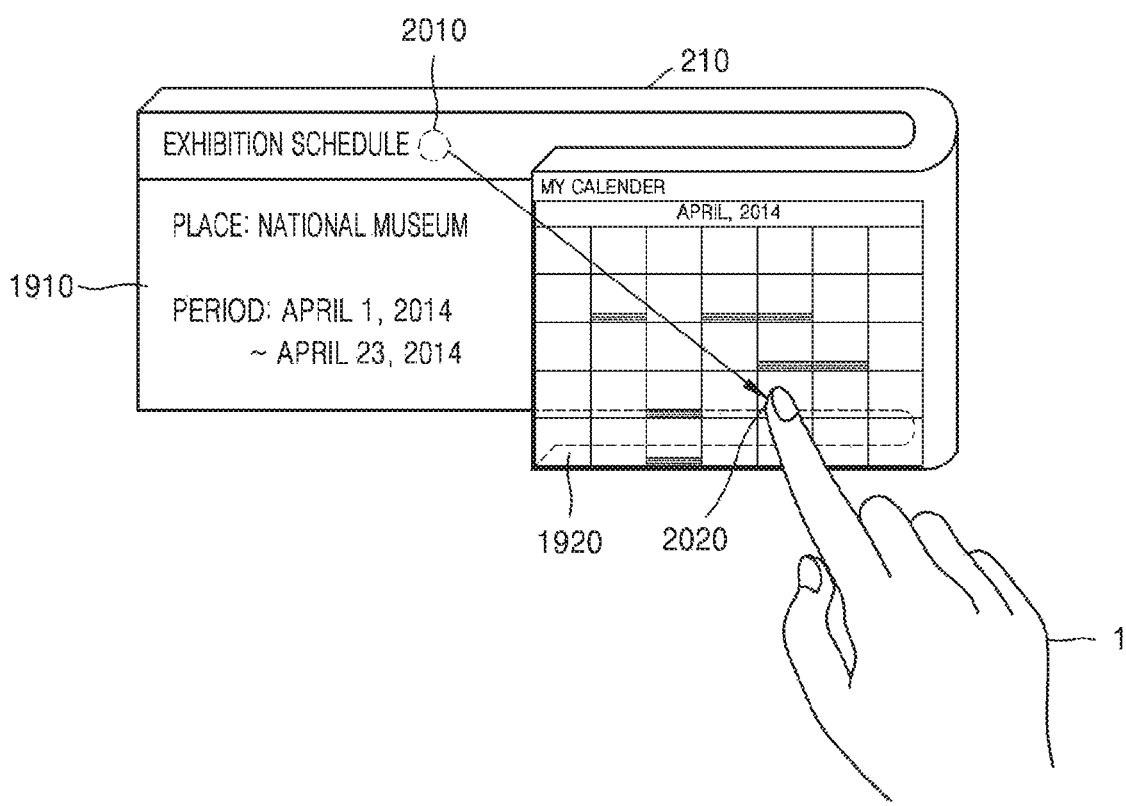

FIGS. 19 and 20 are conceptual diagrams of an example related to operations of the display device 100 in accordance with some example embodiments in which the transparent display 210 of the display device 100 is flexible.

The first view 1902 of FIG. 19 is a view of an example in which first content 1910 and second content 1920 are rendered on the transparent display 210 in its original form. Furthermore, the second view 1904 of FIG. 19 is a view of a changed form of the transparent display 210. As shown in the second view 1904 of FIG. 19, a user may fold a part of the transparent display 210. As shown in the second view 1904 of FIG. 19, the transparent display may determine an area for displaying the first content 1910 and the second content 1920 according to the folded location.

Also, information may be transmitted and received between the first content 1910 and the second content 1920, with the first content 1910 and the second content 1920 displayed, respectively. Referring to FIG. 20, the first content 1910 may be information related to an event schedule. In addition, the second content 1920 may be an execution screen of a schedule management application. When the first content 1910 and the second content 1920 are displayed as shown in FIG. 20, a touch input, in which the user 1 drags a touch position from one point 2010 of an area where the first content 1910 is displayed to one point 2020 of an area where the second content 1920 is displayed, may be received in the transparent display 210. When the touch input is received, the display device 100 may register an event schedule of the first content 1910 as a schedule of the schedule management application of the second content 1920.

Figure 21:
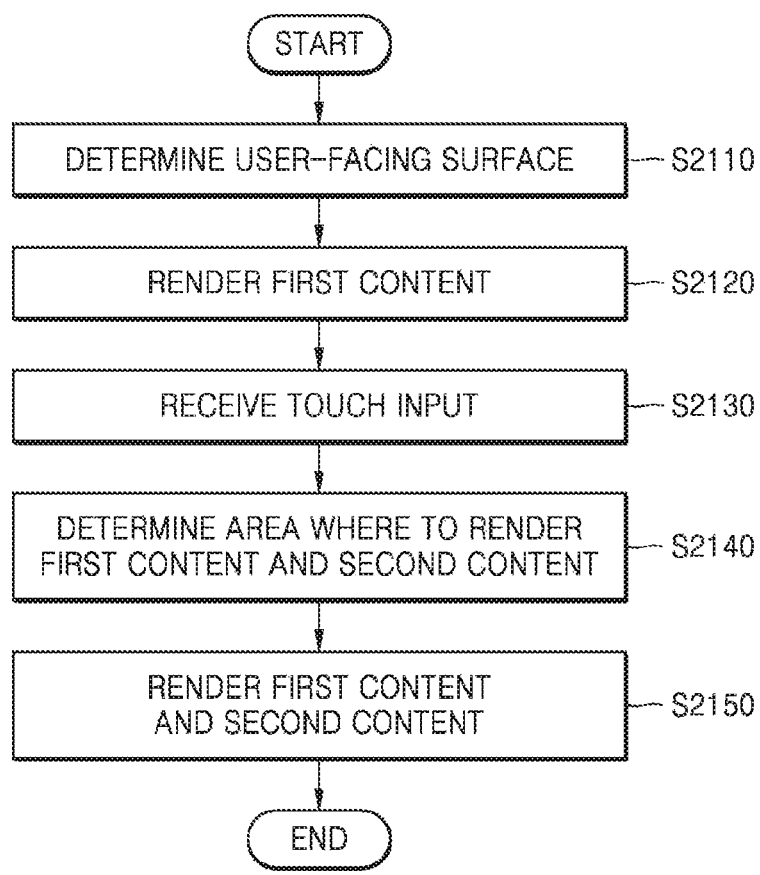
FIG. 21 is a flowchart of a process for controlling a display device according to some example embodiments.
Figure 22:
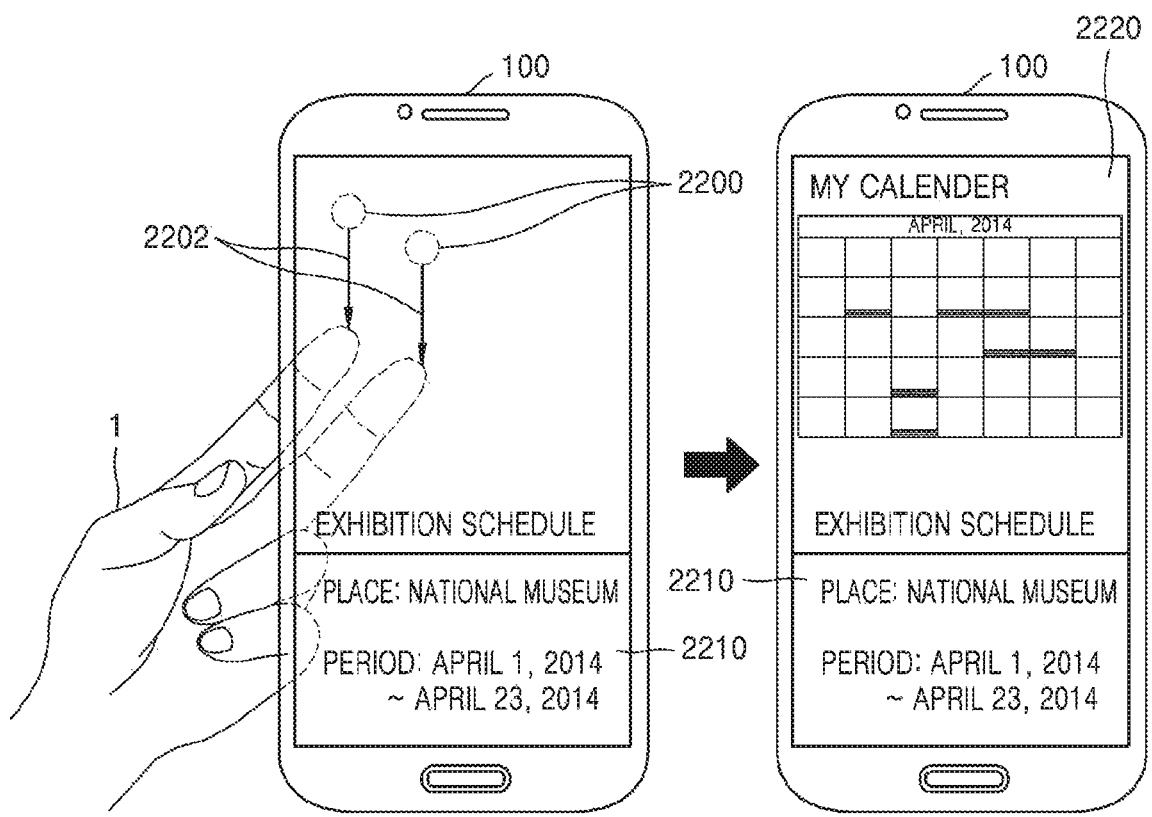
FIG. 22 is a conceptual diagram of an example related to an operation of a display device, according to some example embodiments.

FIG. 21 is a flowchart of a process of rendering first content 2210 and second content 2220 according to a touch input. FIG. 22 is a conceptual diagram of an example of an operation in which the display apparatus 100 renders the first content 2210 and the second content 2220 according to a touch input.

Referring to FIG. 21, in operation S2110, the display device 100 may determine a user-facing surface, and in operation S2120, the display device 100 may render first content 2210 on the transparent display when the determined user-facing surface is a first surface.

With the first content 2210 rendered, in operation S2130, the display device 100 may receive a touch input of the user 1 on the transparent display. Referring to FIG. 22, for example, the display device 100 may receive a touch input in which the user 1 drags a touch input for two points 2200 in one lower direction 2202.

Thereafter, in operation S2140, the display device 100 may determine an area where to render the first content 2210 and the second content 2220 based on the received touch input. For example, when the touch input is moved in the lower direction 2202 as shown in FIG. 22, the display device may determine a part of the lower direction 2202 from the top of the transparent display as an area for displaying the second content 2220. Here, a size of the part of the lower direction 2202 from the top of the transparent display may be proportional to a moving distance of the touch input, but is not limited thereto. An area other than the area for displaying the second content 2220 may be determined to be an area for displaying the first content 2210. According to some example embodiments, if the user-facing surface is the first surface, the touch input may be a touch input to a second surface of the transparent display.

Thereafter, in operation S2150, the display device 100 may render the first content 2210 and the second content 2220 on the determined area. Referring to FIG. 22, the display device 100 may display the first content 2210 in a part of the transparent display 210 and the second content 2220 in another part of the transparent display 210.

An example embodiment of the present invention may be embodied as computer readable code/instructions on a recording medium, e.g., a program module to be executed in computers, the program module including computer-readable commands. The computer readable medium may be any usable medium that may be accessed by a computer, and may include any usable medium, such as, a volatile medium (e.g., Random Access Memory (RAM)) and non-volatile medium (e.g., Read Only Memory (ROM)), and a discrete type and non-discrete type medium. Also, the computer readable medium may include all computer storing media and communication media. The computer storing medium may include any medium, such as, a volatile and non-volatile medium and a discrete type and non-discrete type medium that is realized by a method or technique for storing information, such as, a computer readable command, a data structure, a program module, or other data. The communication medium may include other data of modulated signal, such as, a computer readable command, a data structure, a program module, or a carrier signal, or other transmission mechanism, and an arbitrary information medium. For example, the computer storing medium may include ROM, RAM, flash memory, a compact disc (CD), a digital versatile disk (DVD), a magnetic disk, or a magnetic tape.

The example embodiments are examples, and thus, it will be understood by those of ordinary skill in the art that various changes in form and details may be made therein without departing from the spirit and scope of the invention. Therefore, the example embodiments should be considered in descriptive sense only and not for purposes of limitation. For example, each constituent element that is described as a singular form may be embodied in distribution forms. Also, constituent elements that are described in distribution forms may be embodied in a combined form.

Therefore, the scopes of the example embodiments are defined not by the detailed description but by the appended claims, and all differences within the scope will be construed as being included in the example embodiments.

The invention claimed is:

1. A display device comprising:
a transparent display;
a memory storing one or more instructions; and
a processor configured to execute the one or more instructions to:
  determine a user-facing surface from among a first surface of the transparent display and a second surface of the transparent display, the user-facing surface referring to a surface which faces a user;
  receive a first touch input on the first surface of the transparent display and a second touch input on the second surface of the transparent display;
  based on determining that the user-facing surface is determined as the first surface, the first touch input is received on a left-half plane of the first surface, the second touch input is received on a right-half plane of the second surface and the display device is turned over from the second surface to the first surface in a first rotation direction, render first content on the transparent display in a direction corresponding to the first surface; and
  based on determining that the user-facing surface is determined as the second surface, the second touch input is received on the right-half plane of the second surface, the first touch input is received on the left-half plane of the first surface and the display device is turned over from the first surface to the second surface in a second rotation direction, render second content instead of the first content on the transparent display in a direction corresponding to the second surface.

2. The display device of claim 1, wherein the processor is further configured to:
control the memory to store a first state that includes information indicating a state of the first content finally provided to the user and a second state that includes information indicating a state of the second content finally provided to the user;
render the first content on the transparent display based on the stored first state when the user-facing surface has been changed from the second surface to the first surface; and
render the second content on the transparent display based on the stored second state when the user-facing surface has been changed from the first surface to the second surface.

3. The display device of claim 1, further comprising:
a sensor capable of sensing rotation of the display device, wherein the processor is further configured to determine that the user-facing surface has been changed when the sensor senses rotation of the display device.

4. The display device of claim 3, wherein the processor is further configured to: determine a direction in which to render the first content or the second content based on the rotation direction of the display device and render the first content or the second content based on the determined direction.

5. The display device of claim 3, wherein the sensor includes a gyro sensor and the processor is further configured to detect the rotation of the display device using the gyro sensor.

6. The display device of claim 1, wherein
the transparent display includes a flexible display that is physically deformable, and
the processor is further configured to render the first content and the second content on the transparent display based on a type of the transparent display.

7. The display device of claim 1, further comprising: a first camera arranged on the first surface and a second camera arranged on the second surface, wherein the processor is further configured to determine that the user-facing direction corresponds to the first surface when a first image captured using the first camera is recognized to include the face of a user, and to determine that the user-facing direction corresponds to the second surface when a second image captured using the second camera is recognized to include the face of a user.

8. A method of controlling a display device having a transparent display, the method comprising:
determining a user-facing surface among a first surface and a second surface of the transparent display, the user-facing surface referring to a surface which faces a user;
receiving a first touch input on the first surface of the transparent display and a second touch input on the second surface of the transparent display;
based on determining that the user-facing surface is determined as the first surface, the first touch input is received on a left-half plane of the first surface, the second touch input is received on a right-half plane of the second surface and the display device is turned over from the second surface to the first surface in a first rotation direction, render first content on the transparent display in a direction corresponding to the first surface; and
based on the determining that the user-facing surface is determined as the second surface, the second touch input is received on the right-half plane of the second surface, the first touch input is received on the left-half plane of the first surface and the display device is turned over from the first surface to the second surface in a second rotation direction, render second content instead of the first content on the transparent display in a direction corresponding to the second surface.

9. The method of claim 8, further comprising: storing a first state that includes information indicating a state of the first content finally provided to the user, storing a second state that includes information indicating a state of the second content finally provided to the user, wherein the rendering of the first content on the transparent display comprises rendering the first content on the transparent display based on the stored first state when the user-facing surface has been changed from the second surface to the first surface, and the rendering of the second content on the transparent display comprises rendering the second content on the transparent display based on the stored second state when the user-facing surface has been changed from the first surface to the second surface.

10. The method of claim 8, further comprising:
sensing rotation of the display device; and
changing the user-facing surface when the rotation is sensed.

11. The method of claim 10, wherein the rendering comprises:
determining a direction of rendering content corresponding to the changed user-facing surface from the first content or the second content based on the direction of the sensed rotation; and
rendering the first content or the second content based on the determined direction of the sensed rotation.

12. The method of claim 8, wherein
the transparent display includes a flexible display that is physically deformable,
the method of controlling the display device further includes determining a position where a shape of the transparent display is deformed, and
the rendering comprises rendering the first content and the second content on the transparent display based on the determined position.

13. The method of claim 8, wherein
the display device further includes a first camera arranged on the first surface and a second camera arranged on the second surface, and
the determining of the user-facing direction includes determining that the user-facing direction corresponds to the first surface when a first image captured using the first camera is recognized to include the face of a user, and determining that the user-facing direction corresponds to the second surface when a second image captured using the second camera is recognized to include the face of a user.

14. A non-transitory computer-readable recording medium having recorded thereon a program for executing the method of claim 8.

15. The display device of claim 2, wherein the first state includes at least one of: (i) identification information that identifies a moving image being played, (ii) position information indicating a position where the moving image is played, (iii) identification information that identifies a running application, or (iv) information related to an operating state of the running application.

16. The display device of claim 1, wherein the first content and the second content are different types of content.

17. The display device of claim 1, wherein at least one of the first content or the second content is a moving image, a web page or a still image.

18. The display device of claim 1, wherein
the first rotation direction corresponds to a rotation direction in which the user-facing surface is determined as the first surface by turning over the display device from the second surface to the first surface in a left direction, and
the second rotation direction corresponds to a rotation direction in which the user-facing surface is determined as the second surface by turning over the display device from the first surface to the second surface in a right direction.

19. The display device of claim 1, wherein
a page of the first content rendered when the user-facing surface is determined as the first surface is a next page of a content rendered when the user-facing surface is determined as the second surface, and
a page of the second content rendered when the user-facing surface is determined as the second surface is a previous page of a content rendered when the user-facing surface is determined as the first surface.

* * * * *